United States Patent
Lakkis

(10) Patent No.: US 8,401,118 B2
(45) Date of Patent: Mar. 19, 2013

(54) METHOD AND APPARATUS FOR CONSTANT ENVELOPE DEMODULATION

(75) Inventor: Ismail Lakkis, San Diego, CA (US)

(73) Assignee: Adeptence LLC, Carlsbad, CA (US)

( * ) Notice: Subject to any disclaimer, the term of this patent is extended or adjusted under 35 U.S.C. 154(b) by 826 days.

(21) Appl. No.: 12/481,429

(22) Filed: Jun. 9, 2009

(65) Prior Publication Data

US 2010/0309959 A1   Dec. 9, 2010

(51) Int. Cl.
*H03D 3/22* (2006.01)
*H04L 27/22* (2006.01)

(52) U.S. Cl. ......... 375/329; 375/279; 375/322; 375/308

(58) Field of Classification Search .................... 375/329
See application file for complete search history.

(56) References Cited

U.S. PATENT DOCUMENTS

| | | | | |
|---|---|---|---|---|
| 6,721,366 B1* | 4/2004 | Van Stralen | ................... | 375/262 |
| 6,968,021 B1* | 11/2005 | White et al. | ................... | 375/340 |
| 7,088,793 B1* | 8/2006 | Mickelson et al. | ........... | 375/341 |
| 2003/0112061 A1* | 6/2003 | Kiviranta | ...................... | 329/315 |
| 2004/0146115 A1* | 7/2004 | Feng et al. | ...................... | 375/260 |
| 2005/0185968 A1 | 8/2005 | Dorrer et al. | | |
| 2005/0249266 A1* | 11/2005 | Brown et al. | .................. | 375/133 |
| 2005/0286653 A1* | 12/2005 | Lai et al. | ........................ | 375/308 |
| 2007/0002986 A1* | 1/2007 | Green | .......................... | 375/353 |
| 2007/0258512 A1* | 11/2007 | Green | .......................... | 375/150 |
| 2008/0061870 A1* | 3/2008 | Tingwu et al. | ................. | 329/304 |
| 2008/0178063 A1* | 7/2008 | Norris et al. | ................... | 714/786 |
| 2009/0028219 A1 | 1/2009 | Djuknic | | |
| 2009/0274164 A1 | 11/2009 | Myers | | |

* cited by examiner

*Primary Examiner* — Erin File
(74) *Attorney, Agent, or Firm* — Procopio Cory Hargreaves & Savitch LLP; Noel C. Gillespie

(57) ABSTRACT

Certain aspects of the present disclosure relate to a method for demodulating CPM modulated signals transmitted in a wired or wireless communication system using a linear modulation model consisting of a linear superposition of time pulses modulated using pseudo-PSK pulses.

21 Claims, 21 Drawing Sheets

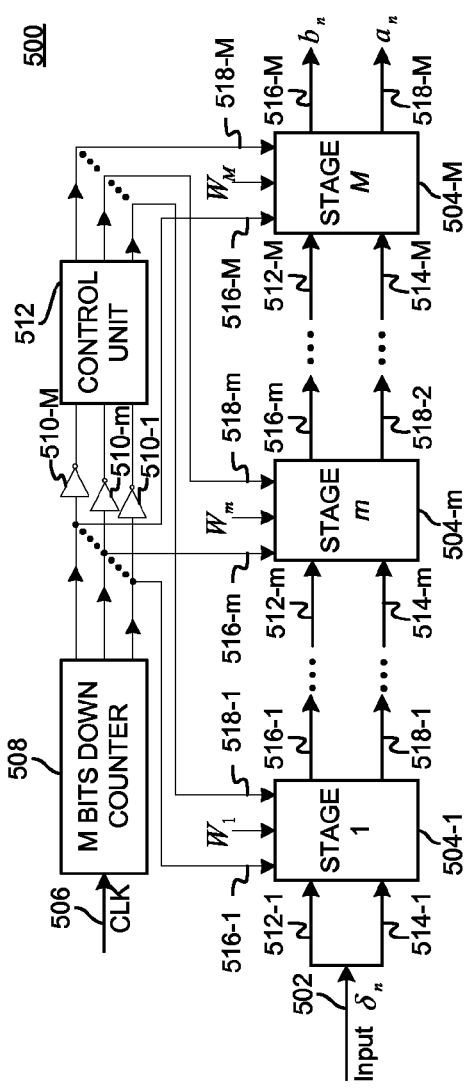
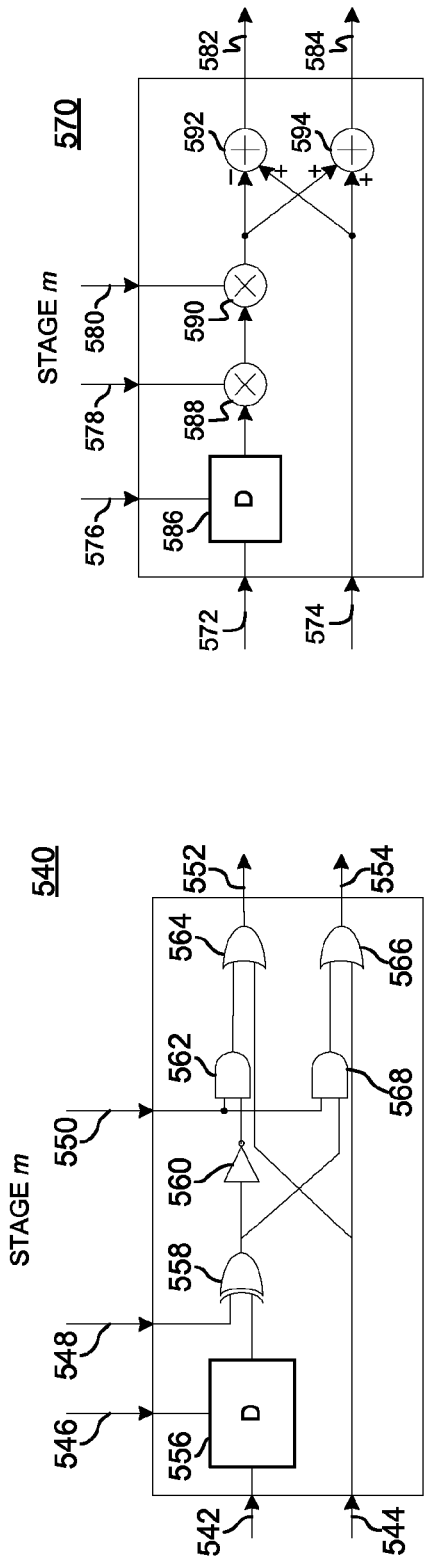
FIG. 5A
FIG. 5B
FIG. 5C

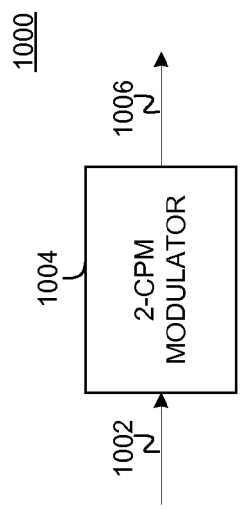
FIG. 10A
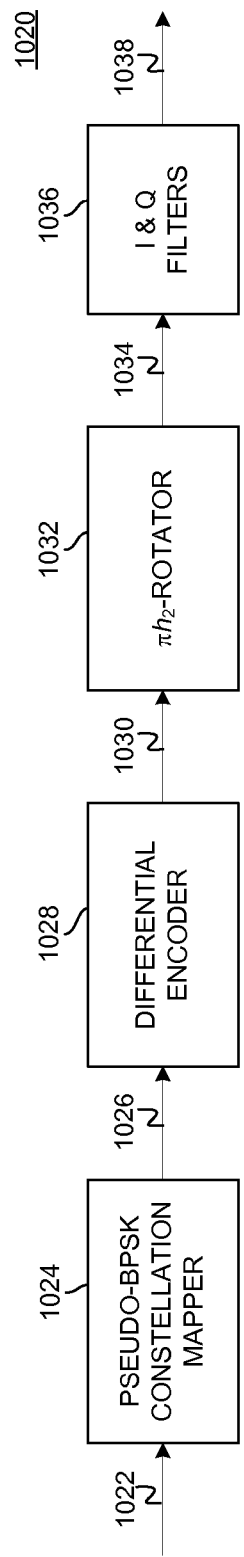
FIG. 10B
FIG. 10D
FIG. 10C

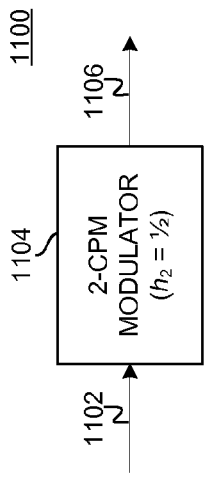
FIG. 11A
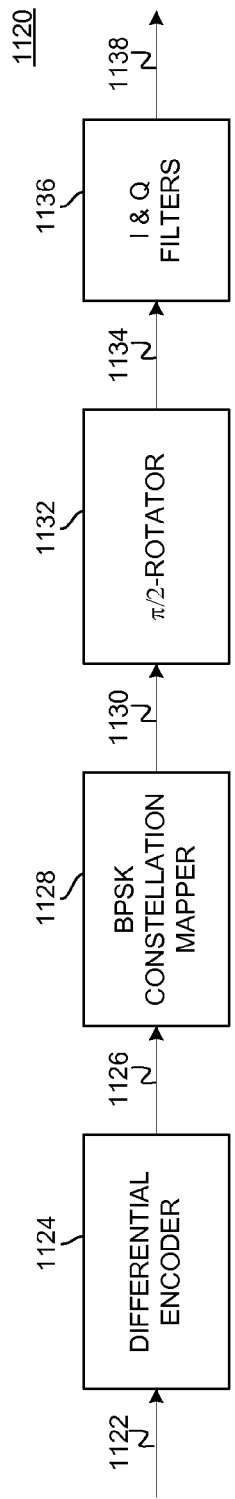
FIG. 11B
FIG. 11C
FIG. 11D

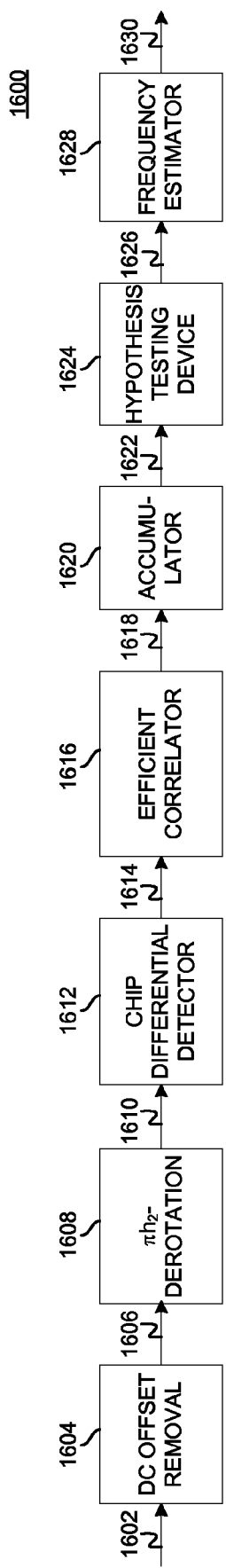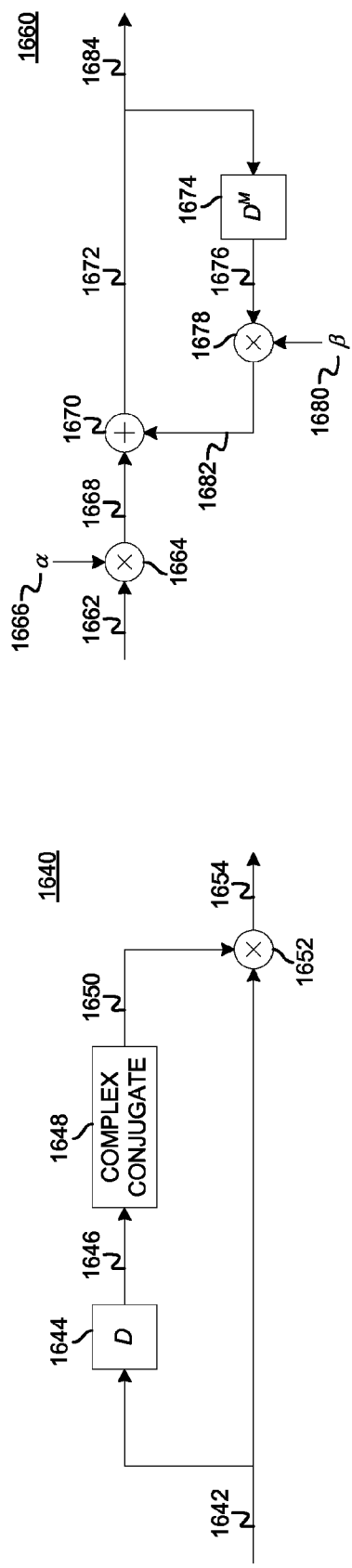
FIG. 16A
FIG. 16B
FIG. 16C

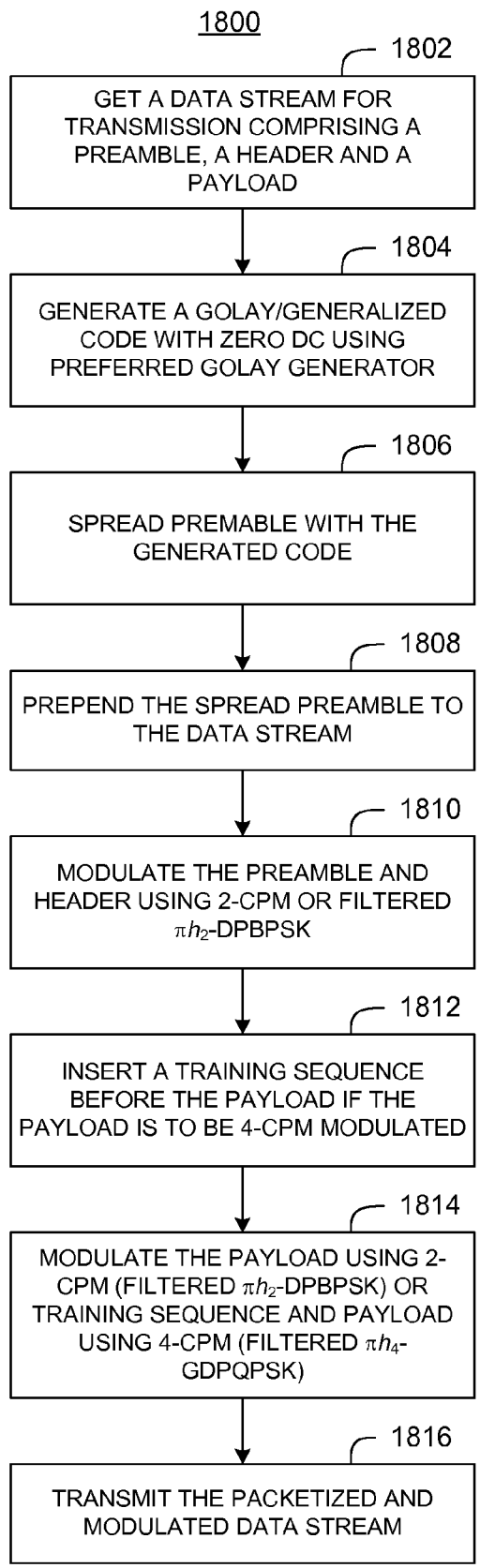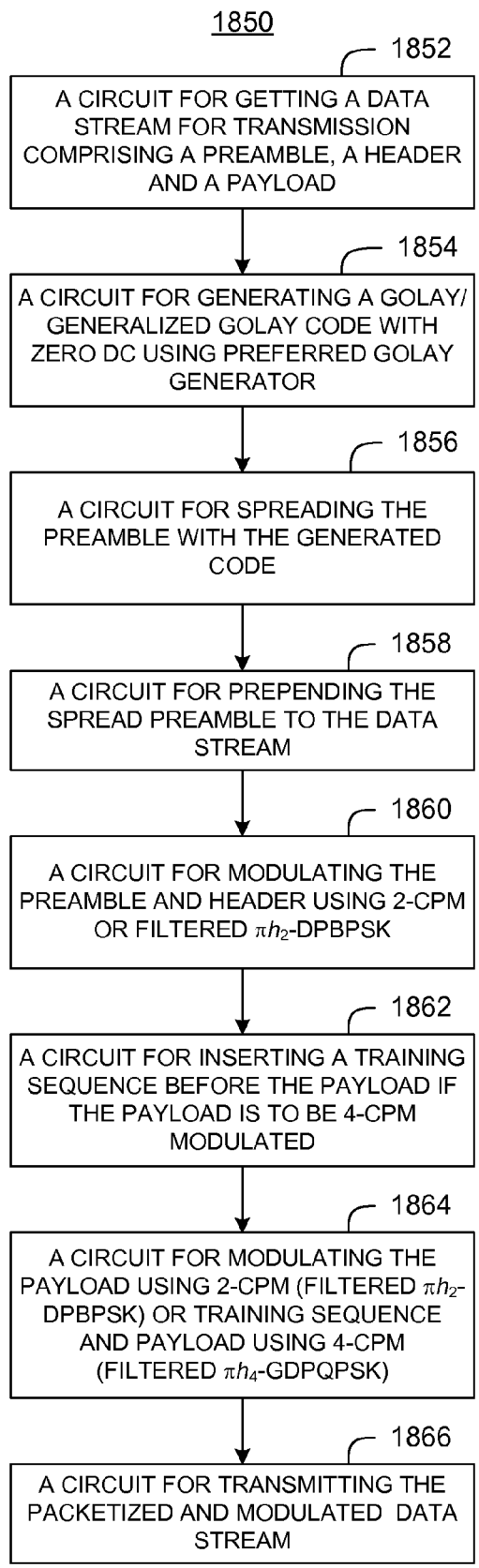
FIG. 18A                    FIG. 18B

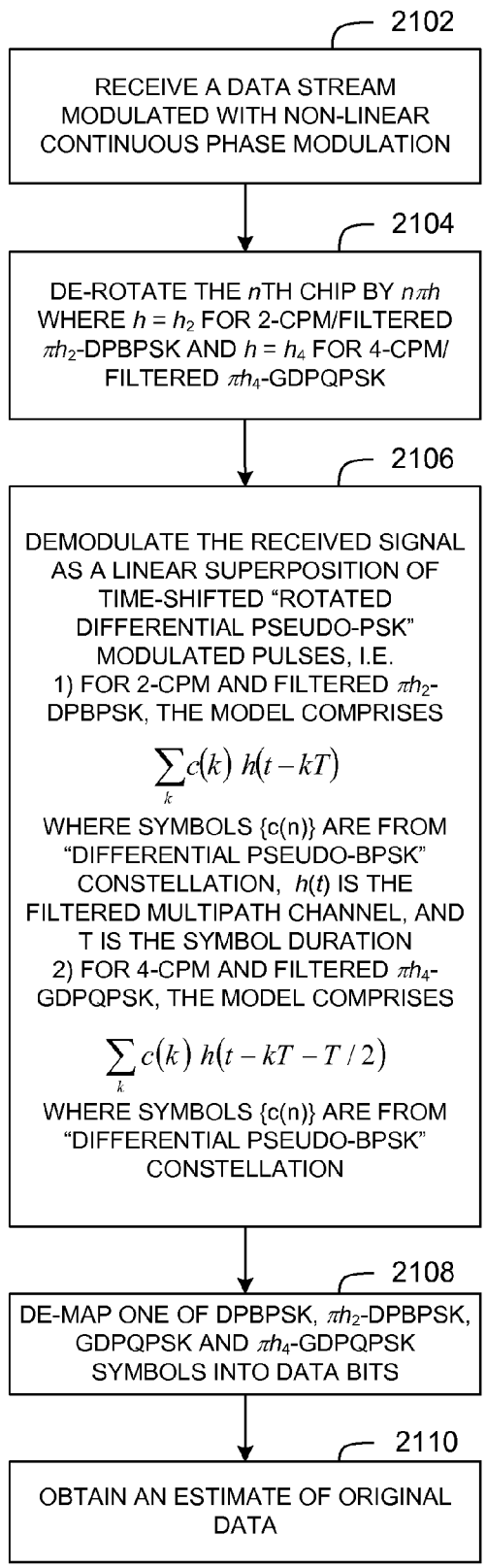
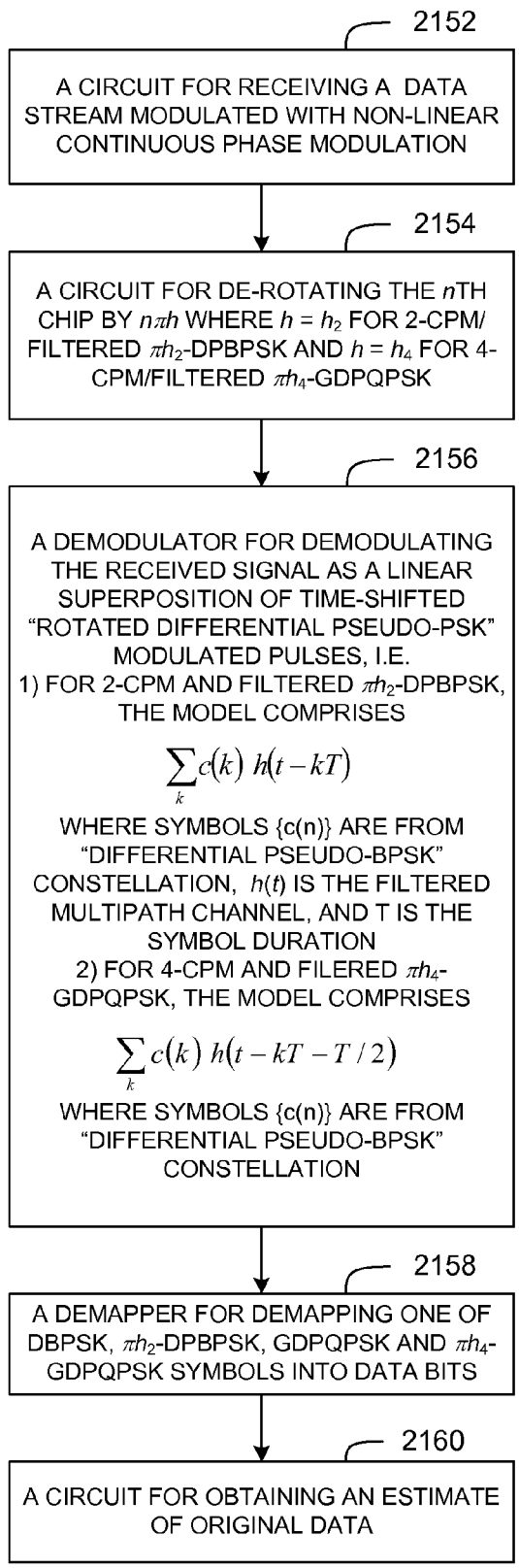
FIG. 21A          FIG. 21B

METHOD AND APPARATUS FOR CONSTANT ENVELOPE DEMODULATION

BACKGROUND

1. Field

Certain aspects of the present disclosure generally relate to constant envelope spread-spectrum coding and, more particularly, to a method for demodulating a continuous phase modulated (CPM) signal.

2. Background

Spread-spectrum coding is a technique by which signals generated in a particular bandwidth can be spread in a frequency domain, resulting in a signal with a wider bandwidth. The spread signal has a lower power density, but the same total power as an un-spread signal. The expanded transmission bandwidth minimizes interference to others transmissions because of its low power density. At the receiver, the spread signal can be decoded, and the decoding operation provides resistance to interference and multipath fading.

Spread-spectrum coding is used in standardized systems, e.g. GSM, General Packet Radio Service (GPRS), Enhanced Digital GSM Evolution (EDGE), Code Division Multiple Access (CDMA), Wideband Code Division Multiple Access (WCDMA or W-CDMA), Orthogonal Frequency Division Multiplexing (OFDM), Orthogonal Frequency Division Multiple Access (OFDMA), Time Division Multiple Access (TDMA), Digital European Cordless Telecommunication (DECT), Infrared (IR), Wireless Fidelity (Wi-Fi), Bluetooth, Zigbee, Global Positioning System (GPS), Millimeter Wave (mmWave), Ultra Wideband (UWB), other standardized as well as non-standardized systems, wireless and wired communication systems.

In order to achieve good spreading characteristics in a system using spread spectrum, it is desirable to employ spreading codes which possess a near perfect periodic or aperiodic autocorrelation function, i.e. low sidelobes level as compared to the main peak, and an efficient correlator-matched filter to ease the processing at the receiver side. Spreading codes with high peak and low sidelobes level yields better acquisition and synchronization properties for communications, radar, and positioning applications.

In spread spectrum systems using multiple spreading codes, it is not sufficient to employ codes with good autocorrelation properties since such systems may suffer from multiple-access interference (MAI) and possibly inter-symbol interference (ISI). In order to achieve good spreading characteristics in a multi code DS-CDMA system, it is necessary to employ sequences having good autocorrelation properties as well as low cross-correlations. The cross-correlation between any two codes should be low to reduce MAI and ISI.

Complementary codes, first introduced by Golay in M. Golay, "Complementary Series," IRE Transaction on Information Theory, Vol. 7, Issue 2, April 1961, are sets of complementary pairs of equally long, finite sequences of two kinds of elements which have the property that the number of pairs of like elements with any one given separation in one code is equal to the number of unlike elements with the same given separation in the other code. The complementary codes first discussed by Golay were pairs of binary complementary codes with elements +1 and −1 where the sum of their respective aperiodic autocorrelation sequence is zero everywhere, except for the center tap.

Polyphase complementary codes described in R. Sivaswamy, "Multiphase Complementary Codes," IEEE Transaction on Information Theory, Vol. 24, Issue 5, September 1978, are codes where each element is a complex number with unit magnitude.

An efficient Golay correlator-matched filter was introduced by S. Budisin, "Efficient Pulse Compressor for Golay Complementary Sequences," Electronic Letters, Vol. 27, Issue 3, January 1991, along with a recursive algorithm to generate these sequences as described in S. Budisin "New Complementary Pairs of Sequences," Electronic Letters, Vol. 26, Issue 13, June 1990, and in S. Budisin "New Multilevel Complementary Pairs of Sequences," Electronic Letters, Vol. 26, Issue 22, October 1990. The Golay complementary sequences described by Budisin are the most practical, they have lengths that are power of two, binary or complex, 2 levels or multi-levels, have good periodic and aperiodic autocorrelation functions and most importantly possess a highly efficient correlator-matched filter receiver.

However, Golay sequences are not without drawbacks. First, Golay sequences don't exist for every length, for example binary complementary Golay sequences are known for lengths $2^M$ as well as for some even lengths that can be expressed as sum of two squares. Second, an efficient Golay correlator-matched filter exists only for Golay sequences generated by Budisin's recursive algorithm and that are of length that is a power of two (i.e. $2^M$). Third, the Golay sequences generated using Budisin's recursive algorithm might not possess the desired correlation properties. Furthermore, good spreading sequences such as m-sequences, Gold sequences, Barker sequences and other known sequences do not possess a highly efficient correlator-matched/mismatched filter.

WBAN (Wireless Body Area Networks) are envisioned to be crystal-less or will use cheap crystal oscillators. In both cases the system with have high ppm (parts per million) precision on the output frequency. For WBAN spread spectrum systems where there is a substantial frequency offset between the transmitter and the receiver, it might be advantageous to process the received signal differentially first. Golay sequences, m-sequences and other codes do not possess good correlation properties when detected differentially.

Finally, for low power applications such as wearable devices and wireless implants, there is a need for very low power radio that allows operation for long time before changing or charging the battery.

Therefore, there is a need in the art for a method of spread spectrum coding applied at the transmitter and an efficient method for de-spreading at the receiver that allows for large frequency drift between two communicating stations and for a method to reduce the power consumption at the receiver.

Furthermore, there is a need in the art for a practical constant envelope or quasi-constant envelope modulations that enable long battery life while still allowing practical encoding at the transmitter and practical decoding at the receiver.

A decomposition of binary CPM (Continuous Phase Modulation) as a sum of a finite number of time limited amplitude modulated pulse (AMP) was introduced by P. Laurent, "Exact and Approximate Construction of Digital Phase Modulations by Superposition of Amplitude Modulated Pulses (AMP)," IEEE Transaction on Communications, Vol. Com-34, No. 2, February 1982. This was later generalized to non-binary CPM by U. Mengali & al., "Decomposition of M-ary CPM Signals into PAM waveforms," Vol. 41, No. 5, September 1995. In both cases, the number of pulses remained large for practical CPM modulations. Therefore, there is a need in the art for a single pulse representation of CPM signals which allow us to process CPM as a linear modulation in a similar fashion to BPSK, QPSK and QAM modulations.

SUMMARY

Certain aspects provide a method for wireless and wired communications. The method generally includes spreading at least one of the fields of a data stream with one or plurality of spreading sequences wherein at least one of the spreading sequences is based on one of differential m-sequence and differential generalized Golay sequences, and transmitting the spread data stream.

Certain aspects provide a method for wireless and wired communications. The method generally includes receiving a spread data stream wherein at least one of the fields is spread with one or plurality of spreading sequences, and despreading the spread fields of the data stream using a differential detector followed by one of generalized efficient Golay correlator and efficient Walsh correlator.

Certain aspects provide a method for wireless and wired communications. The method generally includes spreading a preamble sequence with a Golay code or a generalized Golay code generated using an efficient Golay generator, pre-pending the preamble to a header and a payload to create a packet, and modulating the packet using one off binary CPM (Continuous Phase Modulation) such as GMSK/GFSK (Gaussian Minimum shift Keying/Gaussian Frequency Shift Keying), filtered and rotated differential pseudo-BPSK, 4-PAM CPM, and filtered and rotated generalized differential pseudo-QPSK.

Certain aspects provide a method for wireless and wired communications. The method generally includes receiving a data stream comprising a preamble based on Golay or generalized-Golay spreading code, de-rotating the signal, applying a differentially detection operation, correlation using an efficient Golay or generalized-Golay correlator, accumulating the outputs of the Golay correlator in a shift register and detecting the presence or absence of the packet by comparing the magnitude of the values in the shift register to a threshold and establishing timing and estimating the frequency offset and using the remainder of the preamble to estimate the CIR (channel impulse response) and end of preamble.

Certain aspects provide a method for wireless and wired communications. The method generally includes receiving a 2-CPM modulated data stream, de-rotating the data stream, and decoding the data stream by modeling the received signal as a linear convolution between the pseudo-BPSK symbols (chips) and the multipath channel.

Certain aspects provide a method for wireless and wired communications. The method generally includes pre-pending training sequence to the payload portion of the data stream, modulating the data stream including the training sequence using 4-CPM or filtered rotated generalized differential pseudo-QPSK and transmitting the packet.

Certain aspects provide a method for wireless and wired communications. The method generally includes receiving a 4-CPM modulated data stream, de-rotating the data stream, obtaining a CIR estimate using correlation with the pseudo-QPSK training sequence followed by correcting the CIR, and using the CIR to decode the payload by modeling the payload as a linear convolution between the pseudo-QPSK symbols (chips) and the CIR.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

FIG. 5A illustrates a preferred Golay generator in accordance with certain aspect of the present disclosure which may be used at a transmitter to generate one or multiple generalized Golay codes that may be used for spreading one or multiple fields of a data stream to be transmitted.

FIG. 5B illustrates one of the stages of the preferred binary Golay generator in accordance with certain aspect of the present disclosure.

FIG. 5C illustrates one of the stages of the preferred non-binary Golay generator in accordance with certain aspect of the present disclosure.

FIG. 10A illustrates a 2-CPM modulator with an arbitrary modulation index used to modulate the data stream to be transmitted.

FIG. 10B illustrates an alternative implementation of a 2-CPM modulator in accordance with certain aspects of the present disclosure.

FIG. 10C illustrates a differential encoder used as a part of the alternative 2-CPM modulator of FIG. 10B.

FIG. 10D illustrates a continuous chip rotator used as a part of the alternative 2-CPM modulator of FIG. 10B.

FIG. 11A illustrates a 2-CPM modulator with modulation index 1/2 used to modulate the data stream to be transmitted.

FIG. 11B illustrates an alternative implementation of a 2-CPM modulator with modulation index 1/2 in accordance with certain aspects of the present disclosure.

FIG. 11C illustrates a differential encoder used as a part of the alternative 2-CPM modulator of FIG. 11B.

FIG. 11D illustrates a continuous chip rotator used as a part of the alternative 2-CPM modulator of FIG. 11B.

FIG. 16A illustrates an efficient preamble processing at the receiver in accordance to ones aspect of the disclosure.

FIG. 16B illustrates a differential detector to be used as part of the preamble processing unit of FIG. 16A.

FIG. 16C illustrates an example accumulator implementation using IIR (Infinite Impulse Response) that may be used in the preamble processing unit of FIG. 16A.

FIG. 18A illustrates example operations for spreading and 2-CPM modulating in accordance with certain aspects of the present disclosure.

FIG. 18B illustrates example components capable of performing the operations illustrated in FIG. 18A.

FIG. 21A illustrates example operations for demodulating a 2-CPM, 4-CPM, filtered rotated pseudo BPSK, and filtered rotated generalized pseudo QPSK data streams according with certain aspects of the present disclosure.

FIG. 21B illustrates example components capable of performing the operations illustrated in FIG. 21A.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

The word "exemplary" is used herein to mean "serving as an example, instance, or illustration." Any aspect described herein as "exemplary" is not necessarily to be construed as preferred or advantageous over other aspects.

Although particular aspects are described herein, many variations and permutations of these aspects fall within the scope and spirit of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

An Example Wireless Communication System

The techniques described herein may be used for various wireless and wired communication systems, including communication systems that are based on a single carrier transmission. Aspects disclosed herein may be advantageous to systems employing Code Division Multiple Access (CDMA) signals. However, the present disclosure is not intended to be limited to such systems, as other coded signals may benefit from similar advantages.

Figure 1:
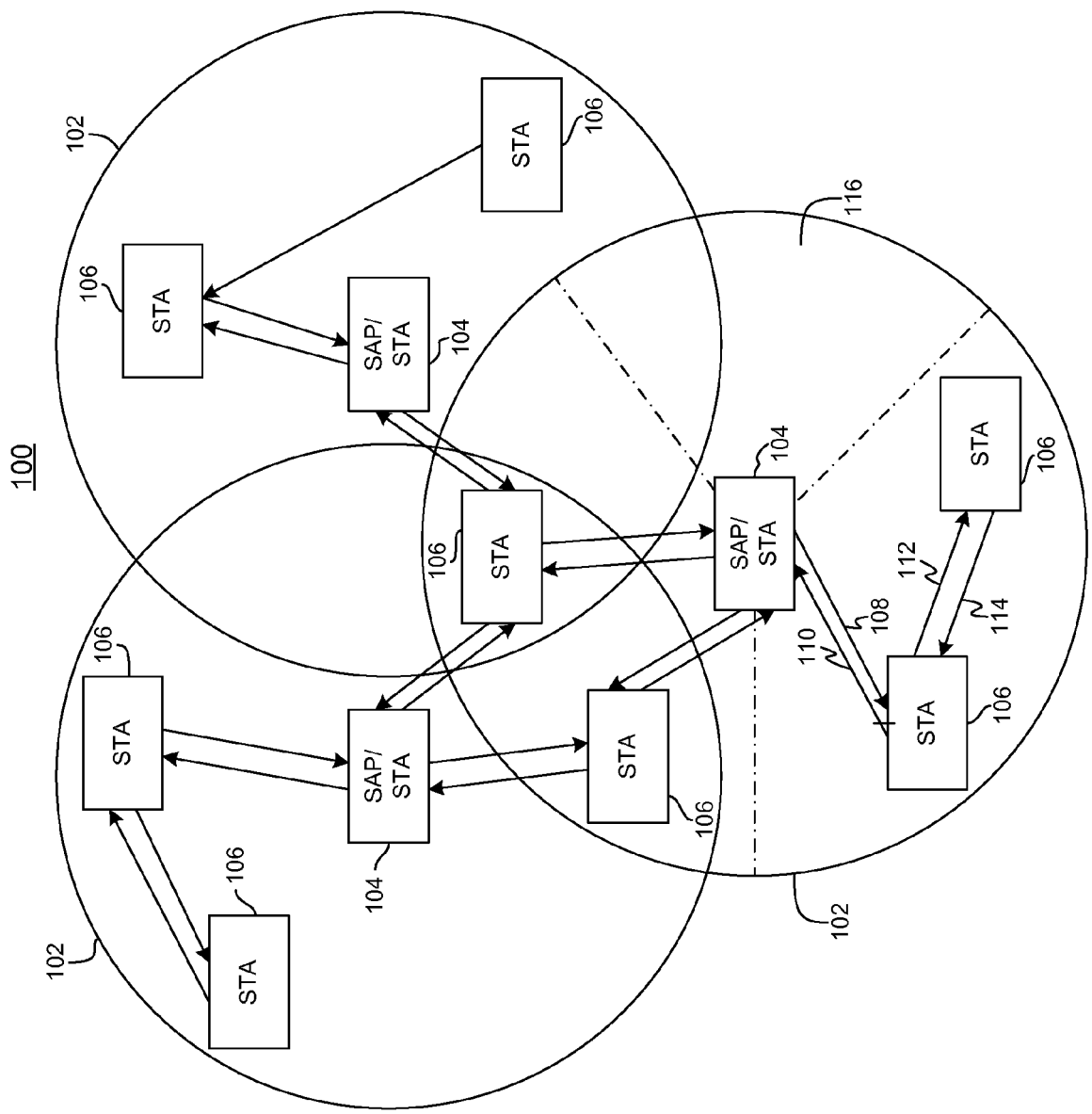
FIG. 1 illustrates an example wireless communication system, in accordance with certain aspects of the present disclosure.

FIG. 1 illustrates an example of a wireless communication system 100 in which aspects of the present disclosure may be employed. The wireless communication system 100 may be a broadband wireless communication system. The wireless communication system 100 may provide communication for a number of Basic Service Sets (BSSs) 102, each of which may be serviced by a Service Access Point (SAP) 104. A SAP 104 may be a fixed station or a mobile station that communicates with Stations (STAs) 106. A BSS 102 may alternatively be referred to as cell, piconet or some other terminology. A SAP 104 may alternatively be referred to as base station, a piconet controller, a Node B or some other terminology.

FIG. 1 depicts various stations 106 dispersed throughout the system 100. The stations 106 may be fixed (i.e., stationary) or mobile. The stations 106 may alternatively be referred to as remote stations, access terminals, terminals, subscriber units, mobile stations, devices, user equipment, etc. The stations 106 may be wireless devices, such as cellular phones, personal digital assistants (PDAs), handheld devices, wireless modems, laptop computers, personal computers, etc.

A variety of algorithms and methods may be used for transmissions in the wireless communication system 100 between the SAPs 104 and the STAs 106 and betweens STAs 106 themselves. For example, signals may be sent and received between the SAPs 104 and the STAs 106 in accordance with CDMA technique and signals may be sent and received between STAs 106 in according with OFDM technique. If this is the case, the wireless communication system 100 may be referred to as a hybrid CDMA/OFDM system.

A communication link that facilitates transmission from a SAP 104 to a STA 106 may be referred to as a downlink (DL) 108, and a communication link that facilitates transmission from a STA 106 to a SAP 104 may be referred to as an uplink (UL) 110. Alternatively, a downlink 108 may be referred to as a forward link or a forward channel, and an uplink 110 may be referred to as a reverse link or a reverse channel. When two STAs communicate directly with each other, a first STA will act as the master of the link, and the link from the first STA to the second STA will be referred to as downlink 112, and the link from the second STA to the first STA will be referred to as uplink 114.

A BSS 102 may be divided into multiple sectors 112. A sector 116 is a physical coverage area within a BSS 102. SAPs 104 within a wireless communication system 100 may utilize antennas that concentrate the flow of power within a particular sector 116 of the BSS 102. Such antennas may be referred to as directional antennas.

Figure 2:
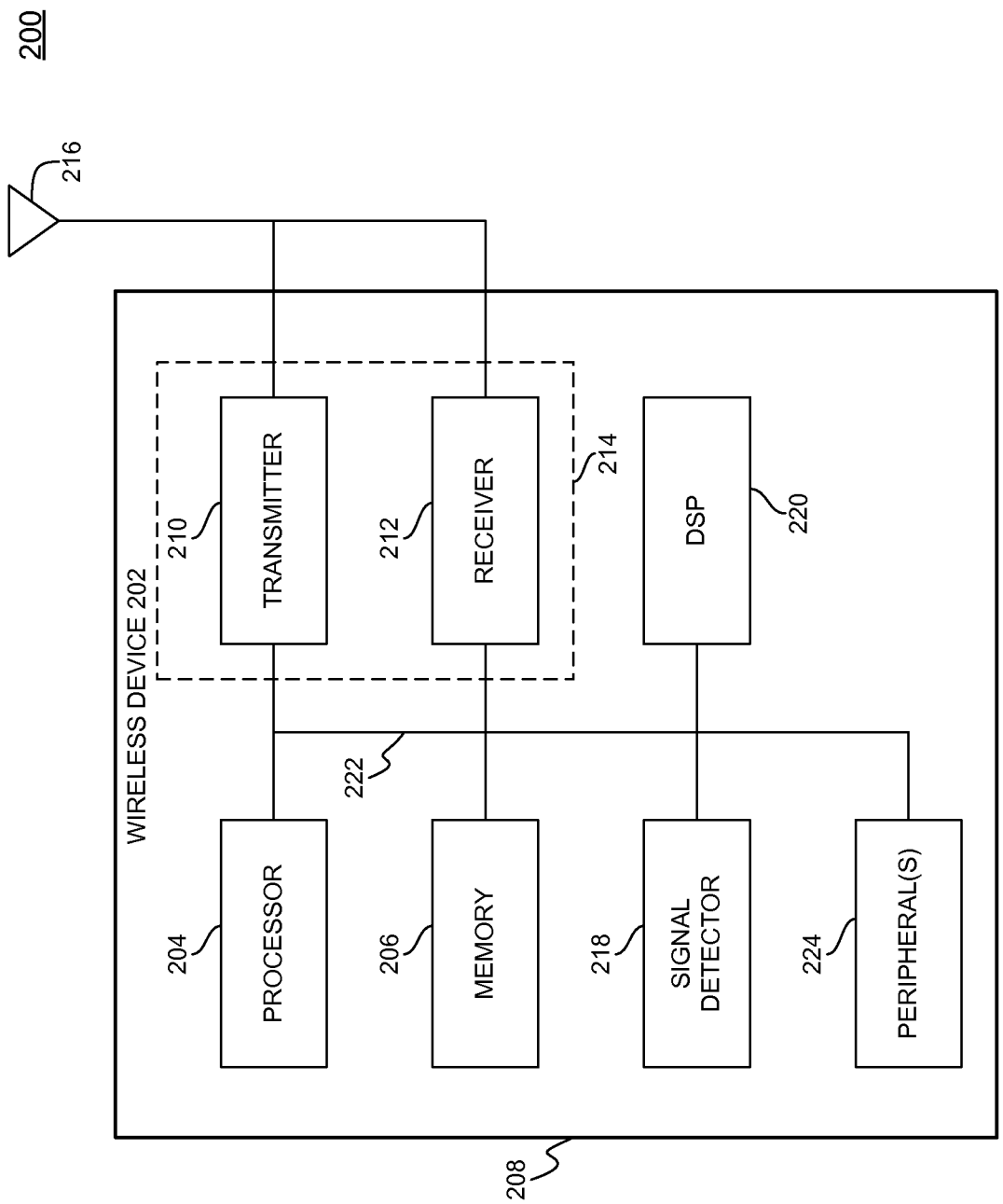
FIG. 2 illustrates various components that may be utilized in a wireless device in accordance with certain aspects of the present disclosure.

FIG. 2 illustrates various components that may be utilized in a wireless device 210 that may be employed within the wireless communication system 100. The wireless device 210 is an example of a device that may be configured to implement the various methods described herein. The wireless device 202 may be a SAP 104 or a STA 106.

The wireless device 202 may include a processor 204 which controls operation of the wireless device 202. The processor 204 may also be referred to as a central processing unit (CPU). Memory 206, which may include both read-only memory (ROM) and random access memory (RAM), provides instructions and data to the processor 204. A portion of the memory 206 may also include non-volatile random access memory (NVRAM). The processor 204 typically performs logical and arithmetic operations based on program instructions stored within the memory 206. The instructions in the memory 206 may be executable to implement the methods described herein.

The wireless device 202 may also include a housing 208 that may include a transmitter 210 and a receiver 212 to allow transmission and reception of data between the wireless device 202 and a remote location. The transmitter 210 and receiver 212 may be combined into a transceiver 214. An antenna 216 may be attached to the housing 208 and electrically coupled to the transceiver 214. The wireless device 202 may include one or more wired peripherals 224 such as USB, HDMI, or PCIE. The wireless device 202 may also include (not shown) multiple transmitters, multiple receivers, multiple transceivers, and/or multiple antennas.

The wireless device 202 may also include a signal detector 218 that may be used in an effort to detect and quantify the level of signals received by the transceiver 214. The signal detector 218 may detect such signals as total energy, energy per subcarrier per symbol, power spectral density and other signals. The wireless device 202 may also include a digital signal processor (DSP) 220 for use in processing signals.

The various components of the wireless device 202 may be coupled together by a bus system 222, which may include a power bus, a control signal bus, and a status signal bus in addition to a data bus.

Figure 3:
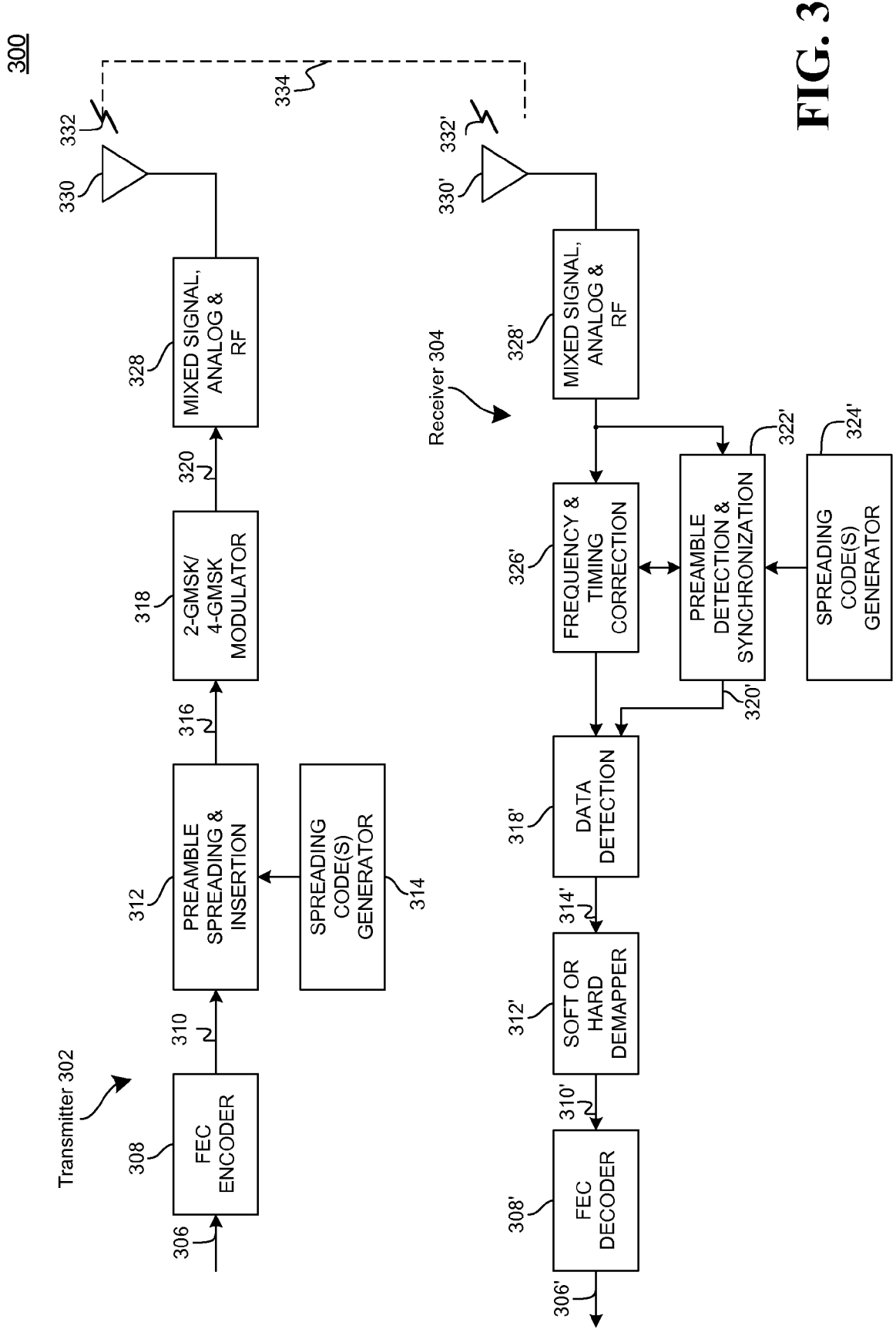
FIG. 3 illustrates an example transceiver that may be used within a wireless communication system in accordance with certain aspects of the present disclosure.

FIG. 3 illustrates an example of a transmitter 302 that may be used within a wireless communication system 100 that utilizes single carrier transmission or some other transmission technique. Portions of the transmitter 302 may be implemented in the transmitter 210 of a wireless device 202. The transmitter 302 may be implemented in a base station 104 for transmitting data 330 to a user terminal 106 on a downlink 108. The transmitter 302 may also be implemented in a station 106 for transmitting data 330 to a service access point 104 on an uplink 110.

Data 306 to be transmitted are shown being provided as input to a forward error correction (FEC) encoder 308. The FEC encoder encodes the data 306 by adding redundant bits. The FEC encoder may encode the data 306 using convolutional encoder, Reed Solomon encoder, concatenated codes, Turbo encoder, low density parity check (LDPC) encoder, etc. The FEC encoder 308 outputs an encoded data stream 310.

The encoded data stream 310 may be pre-pended by a preamble 312 generated from one or multiple spreading sequences from the spreading codes generator 314, and the output stream 316 is input to modulator 318.

The modulator 318 may map the data stream 316 onto different constellation points. The mapping may be done using some modulation constellation, such as 2-GMSK (i.e. binary Gaussian Minimum Shift Keying), 4-GMSK (i.e. four levels Gaussian Minimum Shift Keying), binary phase-shift keying (BPSK), quadrature phase-shift keying (QPSK), 8 phase-shift keying (8PSK), quadrature amplitude modulation (QAM), continuous phase modulation (CPM), etc.

The output stream 320 may then be converted to analog and up-converted to a desired transmit frequency band by a radio frequency (RF) front end 328 which may include a mixed signal and an analog section. An antenna 330 may then transmit the resulting signal 332.

FIG. 3 also illustrates an example of a receiver 304 that may be used within a wireless device 202 that utilizes a single carrier scheme. Portions of the receiver 304 may be implemented in the receiver 212 of a wireless device 202. The receiver 304 may be implemented in a station 106 for receiving data 306 from a service access point 104 on a downlink 108. The receiver 304 may also be implemented in a base station 104 for receiving data 306 from a user terminal 106 on an uplink 110.

The transmitted signal 332 is shown traveling over a wireless channel 334. When a signal 332' is received by an antenna 330', the received signal 332' may be down-converted to a baseband signal by an RF front end 328' which may include a mixed signal and an analog portion. Preamble detection and synchronization component 322' may be used to establish timing, frequency and channel synchronization using one or multiple correlators that correlate with one or multiple spreading codes generated by the spreading code(s) generator 324'.

The output of the RF front end 328' is input to the frequency and timing correction block which corrects for frequency errors between the transmitter 302 and receiver 304 and may interpolate to the best timing before being input to the data detection component 318' along with the synchronization information from 322'. The block detection block may perform de-spreading and equalization.

A demapper 312' may perform the inverse of the symbol mapping operation that was performed by the mapper/modulator 318 thereby outputting soft or hard decisions 310'. The soft or hard decisions 310' are input to the FEC decoder which provides an estimate data stream 306'. Ideally, this data stream 306' corresponds to the data 306 that was provided as input to the transmitter 302.

The wireless systems 100 illustrated in FIG. 1 may a WBAN (Wireless Body Area Network) operating in the frequency bands, 401-406 MHz, 433.5-434. MHz, 608-614 MHz, 868-928 MHz, 902-928 MHz, 1395-1400 MHz, 1427-1432 MHz, and 2400-2483.5 MHz, unlicensed bands specified by the Federal Communications Commission (FCC) and other regulatory bodies.

Golay Codes

In one aspect of the disclosure, spreading codes generated by spreading code(s) generator 314 in a transmitter 302 are based on Golay codes. A summary of Golay codes, their properties, generation and reception is provided next.

A Golay complementary pair of codes of length $N=2^M$, denoted here a and b, are specified by a delay vector $D=[D_1, D_2, \ldots, D_M]$ with elements chosen as any permutation of $\{1, 2, 4, \ldots, 2^M\}$ and a seed vector $W=[W_1, W_2, \ldots, W_M]$. Binary Golay complementary sequences are generated when the seed vector elements $\{W_m\}$ are +1 or −1. Polyphase Golay complementary sequences are generated when the seed vector elements $\{W_m\}$ are arbitrary complex numbers with unit magnitude. Golay complementary pairs of length 1 are defined here as the pair of sequences a=[+1] and b=[+1]. Alternative Golay complementary pairs of length 1 can be used such as a=[+1] and b=[−1].

The following MATLAB code can be used to generate a pair of binary or polyphase Golay complementary codes a and b of length $N=2^M$ with $M \geq 1$, using Budisin's recursive algorithm. The inputs to the MATLAB function being the delay vector D and seed vector W.

```
function [a,b] = GolayGeneratorI(D,W);
M=length (D);N=2^M;
a = [1 zeros(1,N−1)];b = a;
for m=1:M,
    I = mod([0:N−1]−D(m),N);
    an = +W(m)*a + b (I+(1));
    bn = −W(m)*a + b (I+(1));
    a = an; b = bn;
end;
return;
```

It should be appreciated that the Golay code generation describe above can be modified in many ways and still yields a pair of complementary Golay codes. The order of the adders and subtractors can be inverted, and the seed vector elements can multiply wither code a or b in the construction and still yields a pair of complementary Golay codes. To clarify the above, we provide one (out of many) alternative MATLAB Golay code generation, labeled "GolayGeneratorII".

```
function [a,b] = GolayGeneratorII(D,W);
M=length(D);N=2^M;
a = [1 zeros(1,N−1)];b = a;
for m=1:M,
    I = mod([0:N−1]−D(m),N);
    an = a + W(m)*b(I+(1));
    bn = a − W(m)*b(I+(1));
    a = an; b = bn;
end;
return;
```

A brief example of Golay complementary codes will now be provided. Consider Golay complementary codes of length 8 generated using the delay vector D=[2, 1, 4] and seed vector W=[+1, +1, −1]. The MATLAB code "GolayGeneratorII" yields the following two Golay complementary codes $$a=[+1,+1,+1,-1,-1,+1,-1,-1]$$

$$b=[+1,+1,+1,-1,+1,-1,+1,+1]$$

The aperiodic autocorrelation function of sequences a and b, denoted here $R^a$ and $R^b$ respectively, are $$R^a=[-1,-2,-1,0,+1,-2,+1,+8,+1,-2,+1,0,-1,-2,-1]$$

$$R^b=[+1,+2,+1,0,-1,+2,-1,+8,-1,+2,-1,0,+1,+2,+1]$$

The sequences a and b are complementary in the sense that the sum, R, of their aperiodic autocorrelation functions, $R^a$ and $R^b$, is perfect in the sense that it has a main peak and no sidelobes $$R=[0,0,0,0,0,0,0,16,0,0,0,0,0,0,0]$$

Even though a pair of Golay codes is defined to be complementary in terms of their aperiodic autocorrelation functions, they have excellent periodic properties as well. The periodic autocorrelation functions $C^a$ and $C^b$ of the pair of above sequences a and b, are $$C^a=[+8,0,-4,0,0,0,-4,0]$$

$$C^b=[+8,0,+4,0,0,0,+4,0]$$

And the sum, C, of their periodic autocorrelation functions is again perfect, i.e. a main of peak of strength 2N=16 and no sidelobes $$C=[8,0,0,0,0,0,0,0]$$

When used individually, we are interested in the correlation properties of either sequence a or sequence b of the Golay complementary pair. In the example above, the magnitude of the highest sidelobe-level of the aperiodic function of either code is 2 and the magnitude of the highest sidelobe-level of the periodic function of either code is 4. So when analyzed individually these codes may not be the best codes to be used as spreading codes.

Figure 4A:
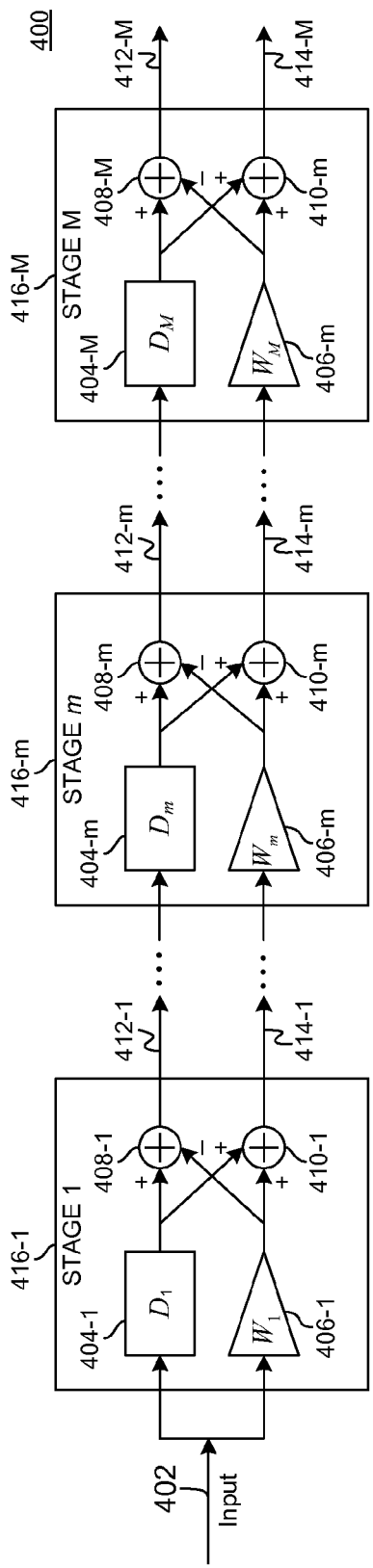
FIG. 4A illustrates an efficient Golay generator/correlator that may be used to generate a pair of Golay complementary codes or to perform matched filtering operations.

FIG. 4A shows a circuit that can be configured as an efficient Golay generator that may be used to generate a pair of Golay complementary sequences that may be part of a transmitter 210 within a wireless device 202. Alternatively, the circuit in FIG. 4A may be configured as an efficient Golay correlator (or matched filter) to be used in a receiver 212 within a wireless device 202.

When configured an efficient Golay generator, the input 402 is a Kronecker delta sequence δ(n) which has the value one at lag 0 (i.e. at n=0) and zero everywhere else. When configured as an efficient Golay correlator, the input 402 may be a quantized received signal x(n).

The Golay code generator/correlator of FIG. 4A comprises a sequence of delay components 404-1 to 404-M configured for providing a set of fixed delays as specified by the elements of the delay vector D, a sequence of multipliers 406-1 to 406-M which multiply their input by the elements of the seed vector W, a sequence of subtractors 408-1 to 408-M and a sequence of adders 410-1 to 410-M. The Golay code generator/correlator is modular and comprises M stages, where the stage m, 416-$m$, with m=1, 2, ..., M, comprises a delay component 404-$m$, a multiplier by a seed element 406-$m$, a subtractor 408-$m$, and an adder 410-$m$. The delay component 404-$m$ comprises $D_m$ delay elements where each delay element may comprise R basic memory cells such as Flip-Flops, where R is the number of bits used to represent the inputs to the stage m, i.e. the outputs 412-($m$−1) and 414-($m$−1) of the previous stage. The stage-m outputs 412-$m$ and 414-$m$ are input to the next stage, i.e. stage m+1. When the circuit 400 operates as an efficient Golay generator, the outputs 412-M and 414-M of the last stage are the Golay complementary sequences $h_n$ and $a_n$ with n=0, 1, ..., N−1. When the circuit 400 is configured as an efficient Golay correlator (matched filter), the outputs 412-M and 414-M of the last stage are the convolution between the input x(n) and the reverse and conjugate of the Golay complementary sequences, i.e. the circuit performs matched filter operations, and the outputs 412-M and 414-M are $x_n \otimes b^*_{-n}$ and $x_n \otimes a^*_{-n}$ respectively.

In stage m, 416-$m$, the position of multiplier 406-$m$, adder 410-$m$, and subtractor 408-$m$ can be exchanged while still being a Golay code generator/correlator. To clarify the above, an alternative Golay code generator/correlator is provided in FIG. 4B. The input 452 is configured as above, i.e. when the circuit is configured as an efficient Golay generator, the input is the Kronecker delta sequence δ(n), and when the circuit is configured as n efficient Golay correlator, the input may be a quantized received signal x(n). The Golay code generator/correlator comprises a set of delay components 454-1 to 454-M set according to the delay vector D, a set of multipliers 456-1 to 456-M where each multiplier multiplies its input with the corresponding element from the seed vector W, a set of subtractors 458-1 to 458-M, and finally a set of adders 460-1 to 460-M.

The Golay codes provided above have multiple drawbacks. The efficient Golay generator for a code length $2^M$ is of high complexity as compared for example to a maximal-length sequence (m-sequence) generator for m-sequences of length $2^M-1$. The latter uses a linear feedback shift register (LFSR) with M binary memory elements only. The second drawback is that Golay complementary codes do not exist for every length, for example there are no Golay codes of odd length. Finally, Golay complementary codes have perfect correlation properties when used together in specific ways, but when used individually, these codes are not necessarily optimal.

Preferred Golay Generator

In one aspect of the present disclosure, Golay codes may be used as spreading codes and the spreading-code(s) generator 318 and/or the spreading code(s) generator 324 in transmitter 302 may be configured to generate Golay codes using a preferred Golay code generator.

FIG. 5A shows a preferred binary Golay generator 500 according to one aspect of the disclosure. The circuit 500 generates a pair of Golay complementary sequence $b_n$ and $a_n$ with n=0, 1, ..., N−1, where N=$2^M$. The delay vector D in this configuration is set to D=[$2^{M-1}, 2^{M-2}, \ldots, 2^0$] and the seed vector W=[$W_1, W_2, \ldots, W_M$] has elements {$W_m$} which are logic 0 or 1. The circuit 500 comprises M stages. The first stage inputs 512-1 and 514-1 are tied to input 502 set to a Kronecker delta sequence δ(n) which has the value one at lag 0 (i.e. at n=0) during the first clock cycle of master clock CLK and zero everywhere else. Stage m with m=1, 2, ..., M has five inputs and two outputs. The first two inputs 512-$m$ and 514-$m$ are the outputs of the previous stage, i.e. stage m−1. The third input 516-$m$ is the $m^{th}$ bit of a count-down counter 508 driven by a clock signal 506 labeled CLK. The fourth input is the seed element $W_m$, and the fifth input 518-$m$ is a signal that takes on the values 0 and 1 and is generated by the control unit 512.

The counter 508 is initialized to N−1 and decrements by 1 for each clock cycle of signal CLK. The most significant bit of the counter (i.e. bit of weight $2^{N-1}$) is signal 516-1 and the least significant bit of the counter (i.e. bit of weight $2^0$) is signal 516-M. The counter acts as a clock divider, and the signal 516-$m$ is actually a clock signal with frequency equal to the main signal CLK divided by $2^{M+1-m}$, i.e. CLK/$2^{M+1-m}$. In another aspect of the disclosure, signal 516-$m$ is used as an enable signal that enables input 512-$m$ to be input to stage m block 504-$m$.

The M bits out of the counter 508 are inverted before being input to the control unit 512 with inverters 510-1 to 510-M. The inverted input is equivalent to a counter initialized to zero and counting up by 1 for each clock cycle of signal CLK. The control unit 512 generates M control signals 518-1 to 518-M. The first control signal 518-1 is 1 when the input to the control unit (i.e. the up counter) is equal to N/2 and zero otherwise. The $m^{th}$ control signal 518-$m$ is 1 when the input to the control unit is in the following set of $2^{m-1}$ integers {$D_m, D_m+2^{M+1-m}, D_m+2^{M+2-m}, \ldots, D_m+2^M-2^{M+1-m}$} and zero otherwise. The $M^{th}$ control signal 518-M is 1 when the input to the control unit is in the following set of N/2=$2^{M-1}$ integers {1, 3, 5, ..., N−1} and zero otherwise.

FIG. 5B shows an example implementation of the stage-m in circuit 500 according to one aspect of the disclosure. The inputs 542, 544, 546 and 550 correspond to inputs 512-$m$, 514-$m$, 516-$m$, and 518-$m$ to stage m in circuit 500. The input 548 is seed element $W_m$. The circuit 540 comprises a basic memory storage element (such as a Flip-Flop) 546 driven by input 542. The output of the 556 is XORed in logic XOR gate 548 with signal 548, i.e. with the seed element $W_m$. The stage-m circuit 500 comprises as well a logic INVERTER 560, two AND gates 562 and 568, and two XOR gates 564 and 566. The outputs 552 and 554 correspond to outputs 516-$m$ and 518-$m$ in stage m of circuit 500. The outputs 552 and 554 are equal to the input 544 when the signal 550 is set to zero, i.e. the input passes through to the two outputs. When signal 550 is set to one, input 540 should be zero and the output 554 is equal to the output of XOR gate 558 while output 552 is the inverse of output 554.

Figure 4B:
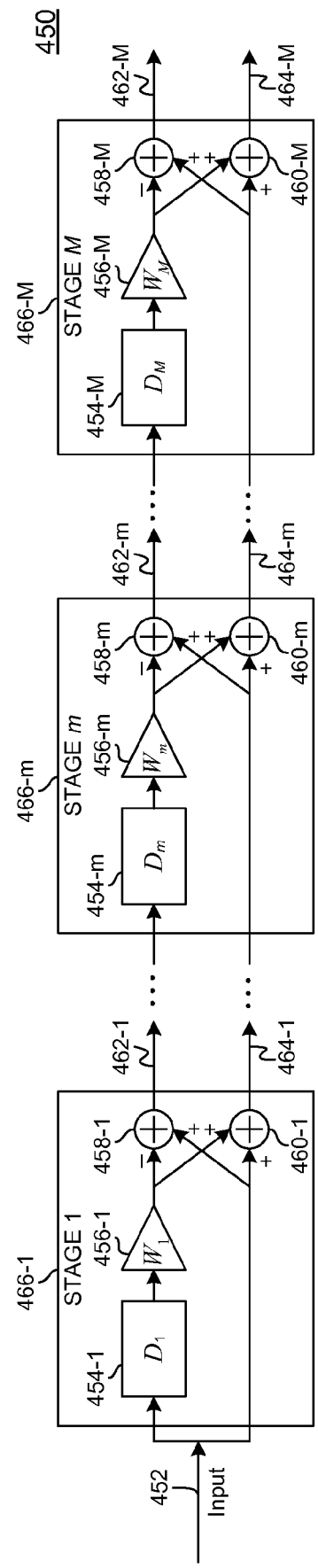
FIG. 4B illustrates an alternative efficient Golay generator/correlator that may be used to generate a pair of Golay complementary codes or to perform matched filtering operations.

The preferred Golay generator in FIG. 5A where each stage may be implemented as shown in FIG. 5B has a very low complexity as compared to the efficient Golay generator shown in FIG. 4A or FIG. 4B. The outputs of the preferred Golay generator are logic 0 and 1 which when mapped to binary levels −1 and +1 yields equivalent output to the efficient Golay generator in FIG. 4B. In order to compare the two architectures, consider for example the generation of a binary Golay code of length 128, i.e. M=7, and N=128, with delay vector D=[$2^{M-1}, 2^{M-2}, \ldots, 2^0$] and an arbitrary binary seed vector W=[$W_1, W_2, \ldots, W_M$]. The elements {$W_m$} are set to logic 0 or logic 1 in FIG. 5A whereas they are set to +1 or −1 in FIG. 4A and FIG. 4B. Each stage in the preferred Golay generator comprises a single basic memory storage element such as a Flip-Flop, and therefore there the preferred Golay generator comprises M basic memory storage elements and some logic gates, a counter and a control unit driven by a counter. The efficient Golay generator comprises 2(N−1)= 254 basic memory storage elements, 2M multiplexers to implement multiplication by the elements of the seed vector W, 2M adders and 2M subtractors where each of the adders and subtractors has 2 inputs with each input being represented with 2 bits (to represent +1, 0, and −1) and 2 bits output. The m-th stage in FIG. 4A or FIG. 4B has $2^m$ memory elements where each memory element comprises two basic memory storage elements such as Flip-Flops. Therefore the total number of basic storage elements is $2(2^6+2^5+\ldots+2^0)=254$ as indicated above.

In another aspect of the disclosure, in the preferred efficient Golay generator in FIG. 5A, the stage m implementation shown in FIG. 5B can be configured in many different ways while still yielding a pair of binary complementary Golay codes. For example, the XOR gate 558 in FIG. 5B can be moved to the lower branch, i.e. the lower input of the XOR gate can be excited by signal 544 instead of being excited with the basic memory storage element output. In addition, the XOR gate 560 can be placed at the lower input to the AND gate 568. Furthermore, the XOR gate 558 and the INVERTER 560 can be moved simultaneously as described above.

In another aspect of the disclosure, the stages 1 to M in the preferred efficient Golay generator in FIG. 5A can be configured to operate with any arbitrary non-binary (possibly complex) seed vector W. Consider the generation of multilevel complex Golay complementary sequences where the real and imaginary can be represented with R-bits integers. FIG. 5C shows an implementation of the stage m, where m=1, 2, . . . , M, according to one aspect of the disclosure. The inputs 572, and 574 are the outputs of the previous stage, i.e. stage m−1, and each can be represented as two R-bits integers, one R-bits integer for the real part and one R-bits integer for the imaginary part. The memory component 586 is clocked with signal 576 corresponding to the $m^{th}$ bit 516-m in FIG. 5A. The memory component 586 comprises 2R basic memory storage elements such as flip-flops (i.e. 2R flip-flops), R basic memory storage elements to store the real part and R basic memory storage elements to store the imaginary part. The complex output of the memory component 586 is multiplied using a complex multiplier with input 578, where input 578 is the $m^{th}$ seed element $W_m$. The output of multiplier 578 is being gated through multiplier 590 with control signal 580 corresponding to the $m^{th}$ control signal 518-m in FIG. 5A. By gating we mean that when control signal 580 is one, the output of multiplier 590 passes through to subtractor 592 and to adder 594, and when control signal 580 is zero, the output of multiplier 590 is being blocked, i.e. set to zero. The output of multiplier 590, i.e. the gated signal, and signal 574 are input to subtractor 592 and adder 594 to yield outputs 582 and 584, where each output is composed of an R-bit integer for the real part and R-bit integer for the imaginary part.

According to another aspect of the present disclosure, the stage m circuit in FIG. 5C can be manipulated in many ways while still yielding a pair of Golay complementary sequences when used in the preferred Golay generator shown in FIG. 5A. As an example, multiplier 588 can be moved to the lower branch, i.e. connected to input 574 rather than to the output of the memory component 586. Multiplier 590 can be moved to lower branch along with multiplier 588. Subtractor 592 and adder 594 can be exchanged, and so on.

According to another aspect of the disclosure, the stages 1 to M in the preferred efficient Golay generator in FIG. 5A can be configured to operate with arbitrary delay vector D and any arbitrary non-binary (possibly complex) seed vector W. The stage m memory component 586 in FIG. 5C, changes its state $2m^{-1}$ times, i.e. stores its input at clock cycles $\{0, 2^{M+1-m}, 2^{M+2-m}, \ldots 2^M-2^{M+1-m}\}$ of master clock CLK 506 in FIG. 5A. Gating signal 580 in FIG. 5C is high $2^{m-1}$ times at clock cycles $\{D_m, D_m+2^{M+1-m}, D_m+2^{M+2-m}, \ldots, D_m+2^M-2^{M+1-m}\}$ of master CLK 506 in FIG. 5A. If $D_m$ is less than $2^{M+1-m}$, i.e. if the first stored input (stored at clock cycle 0) in the memory component is being consumed (at clock cycle $D_m$) before the memory component stores its second input (at clock cycle $2^{M+1-m}$), than stage-m in FIG. 5B for the binary case, and stage-m in FIG. 6A for the general case need not to be changed. If on the other hand If $D_m$ is bigger than $2^{M+1-m}$ but less than $2^{M+2-m}$, than in order for the second input not to overwrite the first input before being consumed, the memory component 556 in FIG. 5B and the memory component 616 in FIG. 6A should contain two memory elements instead of one in one aspect of the disclosure. The remainder of the circuits in FIG. 5B and FIG. 6A remain unchanged. For example memory component 556 in FIG. 5B may be implemented as a shift register of two Flip-Flops to accommodate the above described matter. Therefore, in one aspect of the disclosure, the memory component 556 in FIG. 5B and the memory component 586 in FIG. 5C should contain L memory elements instead of one where L is the index satisfying the following constraint $2^{M+L-1-m} \leq D_m \leq 2^{M+L-m}$. According to the aspect of the disclosure, memory element 556 in FIG. 5B would comprise L basic memory storage element (which can be implemented for example as a shift register of L flip-flops) and memory element 586 in FIG. 5C, would comprise 2R basic memory storage elements (2R flip-flops for example), R basic memory storage elements for the real part and R basic memory storage elements for the imaginary part.

Spreading of Transmission Signal

In another aspect of the present disclosure, the spreading-code(s) generator 314 in FIG. 3 may be configured to generate generalized-Golay spreading codes.

Figure 6A:
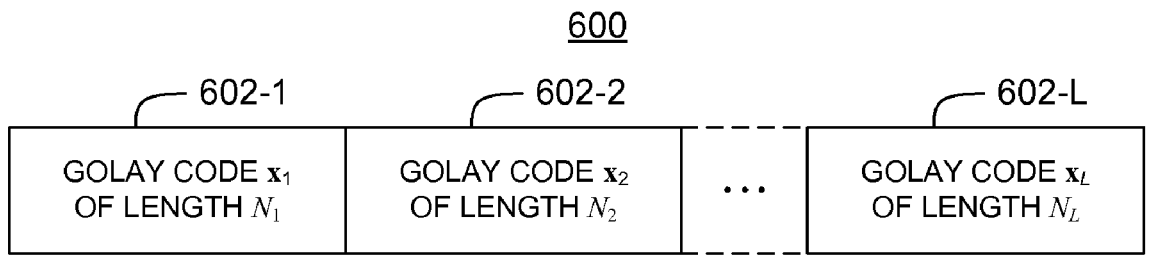
FIG. 6A illustrates a generalized Golay code in accordance to one aspect of the present disclosure which may be used at a transmitter to generate one or multiple generalized Golay codes that may be used for spreading one or multiple fields of a data stream to be transmitted.

A generalized-Golay spreading code is a code that has a Golay decomposition, i.e. a code formed by concatenating a plurality of Golay codes as shown in FIG. 3. The Golay codes used to form a generalized-Golay code can be of type "a" or "b", i.e. either one of the complementary pair of Golay codes can be used, and can be of different lengths. As shown in FIG. 6A, a Generalized-Golay code of length $N=N_1+N_2+\ldots+N_L$ is formed by concatenating a first Golay code 602-1, labeled $x_1$, of type "a" or "b" and of length $N_1$, to a second code Golay code 602-2, labeled $x_2$, of type "a" or "b" and of length $N_2$, and so on. The number of Golay codes, L, is such that $L \geq 2$. Unlike Golay codes, generalized-Golay codes can be of any length, i.e. even, odd, prime, power of two, etc.

In the following, an example of generalized-Golay code according to one aspect of the disclosure is provided. There are no Golay complementary sequences of length 24. In accordance to one aspect of the disclosure, a generalized-Golay sequence of length 24 can be generated by appending a Golay code of length 8 to a Golay code to a length 16. The Golay components should be chosen properly as for the generalized-Golay code to have good correlation properties. A construction example is as follows. First, a pair of Golay complementary codes $a_1$ or sequence $b_1$ of length 16 can be generated using delay vector D=[4, 8, 1, 2] and seed vector W=[+1, +1, +1, +1]:

$a_1$=[+1,+1,+1,−1,+1,+1,+1,−1,+1,−1,+1,+1,−1,+1,−1,−1]

$b_1$=[+1,+1,−1,+1,+1,+1,−1,+1,+1,−1,−1,−1,−1,+1,+1,+1]

Second, a pair of Golay complementary codes $a_2$ and $b_2$ of length 8 can be generated using delay vector D=[4, 2, 1] and seed vector W=[+1, +1, +1]:

$a_2$=[+1,+1,+1,−1,+1,+1,−1,+1]

$b_2$=[+1,−1,+1,+1,+1,−1,−1,−1]

Finally, a generalized-Golay code c of length 24 is formed as follows $c=[a_2 b_1]$=[+1,+1,+1,−1,+1,+1,+1,−1,+1,−1,+1,+1,−1,+1,−1,−1,+1,+1,−1,+1,+1,+1,−1,−1,−1]

The generalized-Golay sequence c has good correlation properties. The maximum sidelobe-level magnitude of the aperiodic and periodic autocorrelation functions is 4 compared to a peak of magnitude 24 which makes it a good spreading code. The generalized code $d=[b_2 \, a_1]$ (constructed from the sequences $b_2$ and $a_1$ complementary to the sequences $a_2$ and $b_1$ used to form c) is not complementary to c; the sum of their aperiodic autocorrelations have very few sidelobes and therefore it is pseudo-complementary.

A second example of a generalized-Golay code according to one aspect of the disclosure is provided next. A generalized code c of length 19 is generated by concatenating three short codes. The first constituent Golay code $a_1$=[1] is of type "a" and length 1, the second constituent Golay code $a_2$=[+1, +1] is of type "a" and length 2 generated using $D_2$=[1] and $W_2$=[+1], and the third constituent Golay code $b_3$=[+1, −1, −1, +1, −1, −1, +1, +1, −1, −1, −1, −1, +1, −1, +1, −1] is of type "b" and length 16 generated using $D_3$=[4, 1, 8, 2] and $W_3$=[−1, −1, −1, +1]. The resulting generalized code c is shown below $c$=[+1,+1,+1,+1,−1,−1,+1,−1,−1,+1,+1,−1,−1,−1,−1,+1,−1,+1,−1]

This length 19 sequence has a periodic autocorrelation function with maximum sidelobe-level magnitude of 1 as compared to the main peak of 19 and has similar properties to maximal length sequences also known as m-sequences.

Figure 6B:
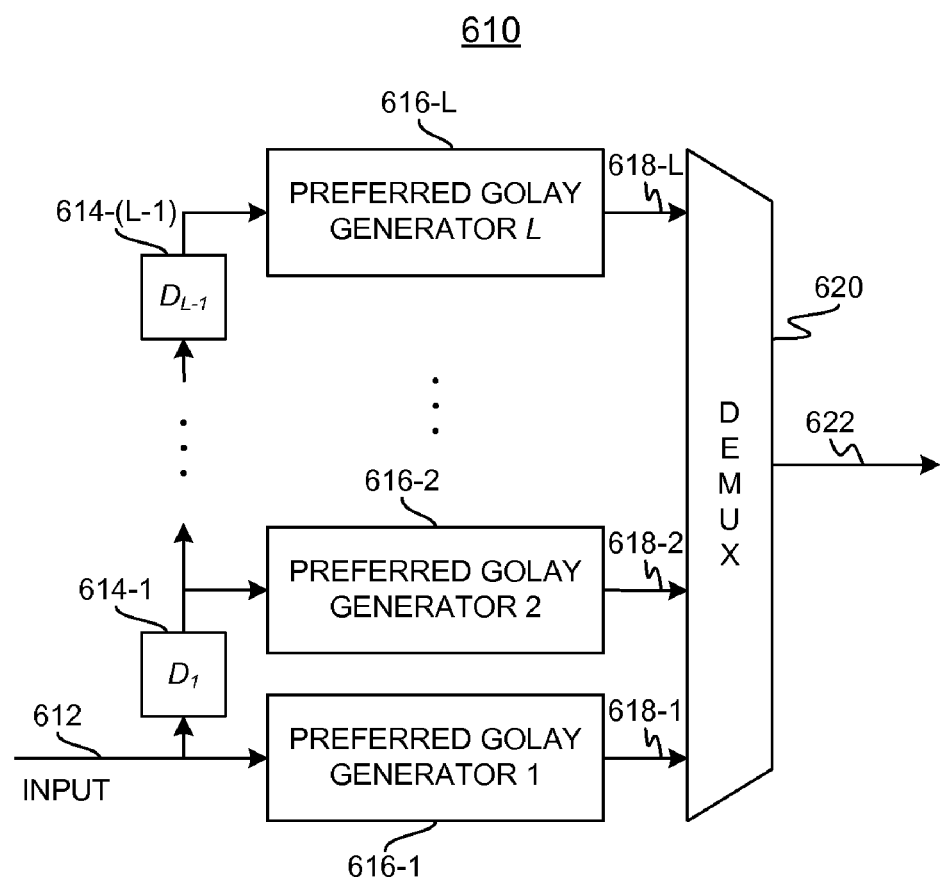
FIG. 6B illustrates a preferred generalized Golay generator in accordance to one aspect of the present disclosure which may be used at a transmitter to generate one or multiple generalized Golay codes that may be used for spreading one or multiple fields of a data stream to be transmitted.

In one aspect of the disclosure, the generalized Golay codes can be generated by concatenating the outputs of a plurality of preferred Golay generators as shown in FIG. 6B. This shall be referred to as preferred Generalized Golay generator. The generalized-Golay code in FIG. 6B is of length $N=N_1+N_2+ \ldots +N_L$ and can be written as $x(n)=x_1(n)+x_2(n-N_1)+ \ldots +x_L(n-N_1-N_2- \ldots -N_{L-1})$ And therefore can be implemented as shown in FIG. 6B. The input 612 is a Kronecker delta sequence δ(n) which has the value one at lag 0 (i.e. at n=0) and zero everywhere else. The input 612 is being delayed through delays 614-1 to 614-(L−1) before exciting the preferred Golay generators 618-1 to 618-(L−1). The first delay component 614-1 may be implemented as $N_1$ basic memory storage elements (such as $N_1$ flip-flops), and the (L−1)$^{th}$ delay element 614-(L−1) may be implemented as $N_{L-1}$ basic memory storage elements (such as $N_1$ flip-flops). The output 618-1 of preferred Golay generator 616-1 is the first Golay code $x_1$(n), the output 618-2 of preferred Golay generator 616-2 is the second Golay code in the Golay decomposition, i.e. $x_2(n-N_1)$ delayed by $N_1$ elements, and the output 618-L of preferred Golay generator 616-L is the L$^{th}$ Golay code in the Golay decomposition, i.e. $x_L(n-N_1-N_2- \ldots -N_{L-1})$ delayed by $N_1+N_2+ \ldots +N_{L-1}$. The outputs 618-1 to 619-L are demultiplexed through demultiplexer 620 to yield the desired generalized Golay code at output 622. In one aspect of the disclosure, the memory components in the first stages of preferred Golay generators 616-1 to 616-L may be shared in order to reduce hardware complexity. As an example of preferred generalized Golay code generation, the length 24 generalized complementary code described above can be generated using two preferred Golay generators, a first preferred binary Golay generator 616-1 as shown in FIG. 5B configured for a delay vector D=[4, 8, 1, 2] and seed vector W=[1, 1, 1, 1] and a second preferred binary Golay generator 616-2 as shown in FIG. 5B configured for a delay vector D=[4, 2, 1] and seed vector W=[1, 1, 1].

Despreading of Received Signal

According to one aspect of the disclosure, a received spread data stream is processed at the receiver using a generalized efficient Golay correlator. As an example, the received signal 332' in FIG. 3, may be despread using a generalized efficient Golay correlator as part of the preamble detection & synchronization block 322'.

Figure 8A:
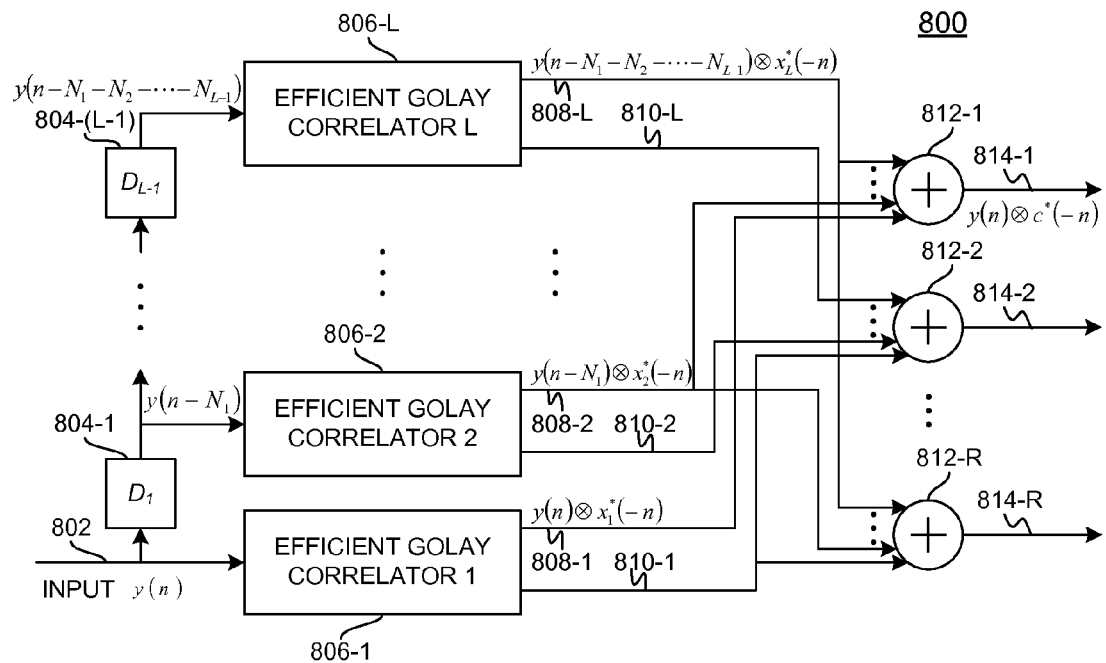
FIG. 8A illustrates an example generalized efficient Golay correlator that may be used within a wireless communication system in accordance with certain aspects of the present disclosure.

FIG. 8A shows a generalized efficient Golay correlator according to one aspect of the disclosure. The generalized Golay correlator functions as a matched filter to a spread transmitted signal using a generalized Golay sequence c(n) such as that illustrated in FIG. 6A. The generalized Golay correlator may also provides matched filtering to other generalized Golay codes constructed using the same constituent Golay codes as generalized Golay sequence c(n). The input signal 802, denoted here y(n), is input to a shift register composed of memory component 804-1 to memory component 804-(L−1). In the general case, the input signal 802 can be a complex number and may be represented using R-bits for its real part and R-bits for its imaginary part. In this case, memory component $D_1$ is composed of $N_1$ delay elements ($N_1$ being the length of the first Golay code 602-1 in FIG. 6A) where each delay element comprises 2R-bits, R-bits to store the real part and R-bits to store the imaginary part, and memory component $D_2$ is composed of $N_2$ delay elements ($N_2$ being the length of the first Golay code 602-2 in FIG. 6A) where each delay element comprises 2R-bits, R-bits to store the real part and R-bits to store the imaginary part and so on. Signal 802, y(n), is input to a first efficient Golay correlator 806-1, and the output 808-1 is the convolution between input y(n) and a matched filter impulse response to the first Golay component 602-1 in FIG. 6A, i.e., output 808-1 equals to y$(n) \otimes x_1^*(-n)$. The second output 810-1 is the convolution between input y(n) and a matched filter impulse response to the complementary of the first Golay code $x_1$(n). The output of memory component 804-1 is the input signal delayed by $N_1$ chips, i.e. y(n−$N_1$) and is input to the second efficient Golay correlator 806-2. The output of 806-2 is the convolution between input y(n−$N_1$) and a matched filter impulse response to the second Golay component 602-2 in FIG. 6A, i.e., output 808-2 equals to y(n−$N_1$)$\otimes x_1^*(-n)$. The second output 810-2 is the convolution between input y(n−$N_1$) and a matched filter impulse response to the complementary of the second Golay code $x_2$(n). The output of memory component 804-(L−1) is the input signal delayed by $N_1+N_2+ \ldots +N_{L-1}$ chips, i.e. y(n−$N_1$−$N_2$−…−$N_{L-1}$) and is input to the L$^{th}$ efficient Golay correlator 806-L. The output of 806-L is the convolution between input y(n−$N_1$−$N_2$− … −$N_{L-1}$) and a matched filter impulse response to the last Golay component 602-L in FIG. 6A, i.e., output 808-L equals to y(n−$N_1$−$N_2$− … −$N_{L-1}$)$\otimes x_L(-n)$. The second output 810-L is the convolution between input $y(n-N_1-N_2-\ldots-N_{L-1})$ and a matched filter impulse response to the complementary of the $L^{th}$ Golay code $x_L(n)$. The outputs 808-1, 808-2, to 808-L of the matched filters to the Golay components are combined through adder 812-1 to yield a generalized Golay correlator/matched filter output 814-1, $y(n) \otimes c^*(-n)$. The outputs 801-1, 802-2 to 802-L and 810-1, 810-2 to 810-L can be combined in different ways to provide convolution between input signal $y(n)$ and a multitude of generalized Golay codes constructed using the same constituent (components) Golay codes but different types as code $c(n)$, i.e. the output 814-2 is the output of the convolution between $y(n)$ and a matched filter to a second generalized Golay code, and 814-R is the output of the convolution between $y(n)$ and a matched filter to an $R^{th}$ generalized Golay code. As an example, output 814-2 can be configured to provide the convolution between $y(n)$ and a matched filter to the pseudo-complementary of generalized Golay code $c(n)$. Efficient Golay correlators 806-1 to 806-L may be implemented as shown in FIG. 4A or FIG. 4B.

According to one aspect of the disclosure, the memory components 804-1 to 804-(L−1) and the memory components in the first stages of efficient Golay correlators 806-1 to 806-L may be shared in order to reduce hardware complexity. An example of this aspect is provided next. Consider the matched filter implementation to the reverse of generalized Golay code of length 32

$$c=[b_1 b_2]=[+1,-1,+1,-1,+1,+1,-1,-1,+1,-1,-1,+1,+\\1,+1,+1,+1,-1,-1,+1,-1,-1,-1,-1,+1,+1,-1,-\\1,-1,+1,-1,+1],$$

constructed from two Golay codes of type "b", code $b_1$ of length 16 generated using delay vector $D=[8, 2, 4, 1]$ and seed vector $W=[+1, +1, +1, +1]$, and code $b_2$ of length 16 is generated using delay vector $D=[8, 1, 4, 2]$ and seed vector $W=[+1, +1, +1, -1]$.

Figure 8B:
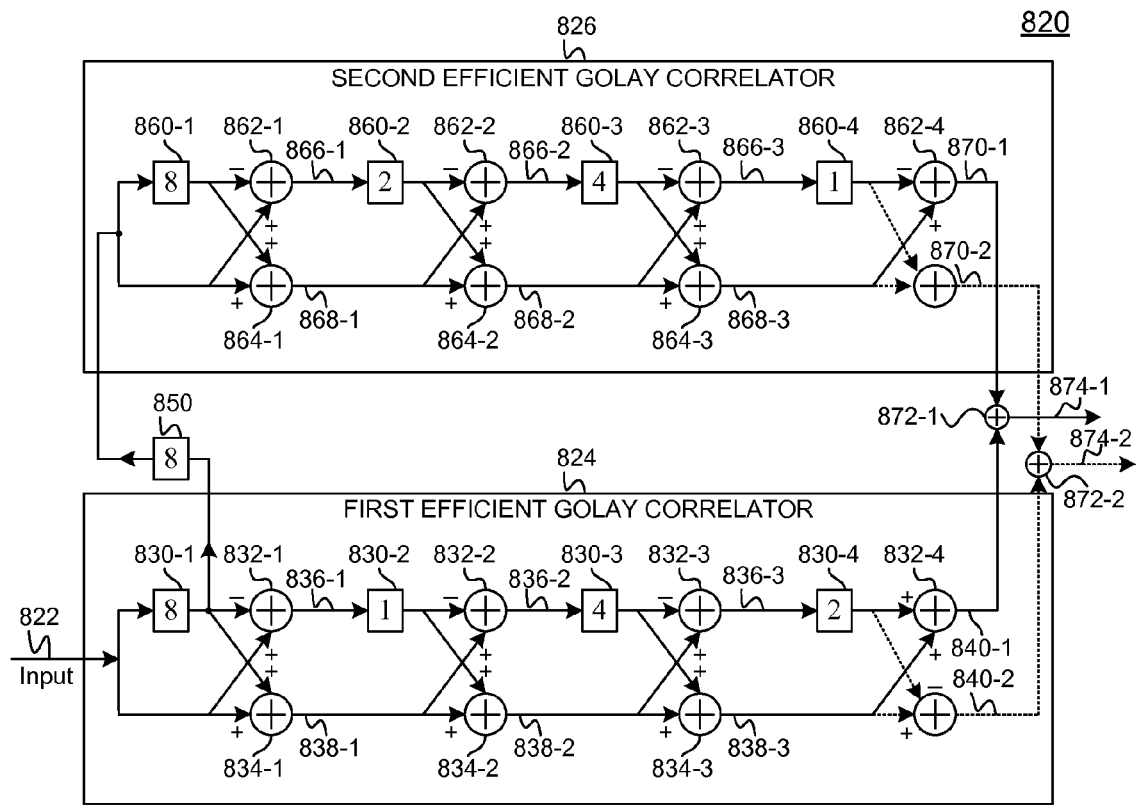
FIG. 8B illustrates example implementation generalized efficient Golay correlator that may be used within a wireless communication system in accordance with certain aspects of the present disclosure.

The generalized efficient Golay correlator/matched filter to a received signal spread with the reverse code $c(N-n)$ is shown in FIG. 8B according to one aspect of the disclosure. The input signal 822 is fed to a first Golay efficient correlator 824. The memory components 830-1, 803-2, 830-3 and 830-4 comprise 8, 1, 4, and 2 delay elements corresponding to the delay vector $D=[8, 1, 4, 2]$. Each delay element comprises 2R-bits, R-bits to store the real part and R-bits to store the imaginary part. In addition to memory components, the first efficient Golay correlator comprises subtractors 832-1, 832-2, and 832-3 and adders 834-1, 834-2, 834-3, and 832-4. The component 830-4 is an adder rather than a subtractor since the last seed element of the seed vector $W=[+1, +1, +1, -1]$ is −1. The outputs of the first efficient Golay correlator 840-1 and 840-2 are the convolution between the input signal 822 and the matched filter response to codes $b_2$, and $a_2$ respectively. According to FIG. 8A, the input 802 should be delayed by $D_1$ chips ($D_1=16$) before being input to the second efficient Golay correlator. This is implemented in FIG. 8B by sharing the first memory component 830-1 of the first efficient Golay correlator and using the output of 830-1 to feed a second memory component 850 of 8 delay elements. This is equivalent to delaying the input signal 822 by 16 delay elements. Sharing more components between the first efficient Golay correlator 824 and the second efficient Golay correlator 826 is further possible depending on the delay vectors and seed vectors. The output of memory component 850 feeds the efficient Golay correlator 826. The second efficient Golay correlator 826 comprises memory components 860-1, 860-2, 860-3 and 860-4 set according to delay vector $D=[8, 2, 4, 1]$ of code $b_1$, a set of subtractors 862-1, 862-2, 862-3 and 862-4, and a set of adders 864-1, 864-2 and 864-3. The resulting outputs 870-1 and 870-2 of the second efficient Golay correlator 826 are the convolution between the input signal 822 and the matched filter response to codes $b_1$ and $a_1$ respectively with the overall results delayed by 16 chips. Finally, outputs 840-1 and 870-1 are combined through adder 872-1 to yield desired output 874-1 which is the output of the generalized Golay correlator/matched filter to code $c(N-n)$. Combining outputs 840-2 and 870-2 through adder 872-2 to yields signal 874-2 which is the output of the generalized Golay correlator/matched filter to the pseudo-complementary code of code $c(N-n)$.

In one aspect of the disclosure, the generalized efficient Golay correlator can be used to despread a modulated data stream with a pair of pseudo complementary generalized Golay codes. For example, the circuit in FIG. 8B provides two outputs 872-1 and 872-2 which may be the correlation between the received modulated data stream and two pseudo complementary generalized Golay codes. The two outputs can be used to decode the encoded bits within the data stream.

For high speed applications, it is advantageous to process the received signal in parallel according to one embodiment of the invention. As an example, if the received signal input 822 in FIG. 8B to be despread is demultiplexed by a factor of four; than the serial generalized Golay correlator shown in FIG. 8B can be modified accordingly and will be referred to as a generalized parallel Golay. The parallelization of the generalized Golay correlator in FIG. 8A will be illustrated with the example in FIG. 8B. It is sufficient to demonstrate the procedure for the efficient Golay correlator 824. Let $y(n)$ be the input 822, and let $p_4(n)$ be the output 840-1 and $q_4(n)$ the output 840-2, and let $Y(z)$, $P_4(z)$, and $Q_4(z)$ be their respective z-transforms. Than we have $$\begin{bmatrix} P_4(z) \\ Q_4(z) \end{bmatrix} = \begin{bmatrix} z^{-2} & 1 \\ -z^{-2} & 1 \end{bmatrix} \begin{bmatrix} -z^{-4} & 1 \\ z^{-4} & 1 \end{bmatrix} \begin{bmatrix} -z^{-1} & 1 \\ z^{-1} & 1 \end{bmatrix} \begin{bmatrix} -z^{-8} & 1 \\ z^{-8} & 1 \end{bmatrix} \begin{bmatrix} Y(z) \\ Y(z) \end{bmatrix}$$

The above can be implemented in the stages as follows $$\begin{bmatrix} P_4(z) \\ Q_4(z) \end{bmatrix} = \begin{bmatrix} z^{-2} & 1 \\ -z^{-2} & 1 \end{bmatrix} \begin{bmatrix} P_3(z) \\ Q_3(z) \end{bmatrix}, \begin{bmatrix} P_3(z) \\ Q_3(z) \end{bmatrix} = \begin{bmatrix} -z^{-4} & 1 \\ z^{-4} & 1 \end{bmatrix} \begin{bmatrix} P_2(z) \\ Q_2(z) \end{bmatrix},$$

$$\begin{bmatrix} P_2(z) \\ Q_2(z) \end{bmatrix} = \begin{bmatrix} -z^{-1} & 1 \\ z^{-1} & 1 \end{bmatrix} \begin{bmatrix} P_1(z) \\ Q_1(z) \end{bmatrix}, \begin{bmatrix} P_1(z) \\ Q_1(z) \end{bmatrix} = \begin{bmatrix} -z^{-8} & 1 \\ z^{-8} & 1 \end{bmatrix} \begin{bmatrix} P_2(z) \\ Q_2(z) \end{bmatrix}$$

Figure 9:
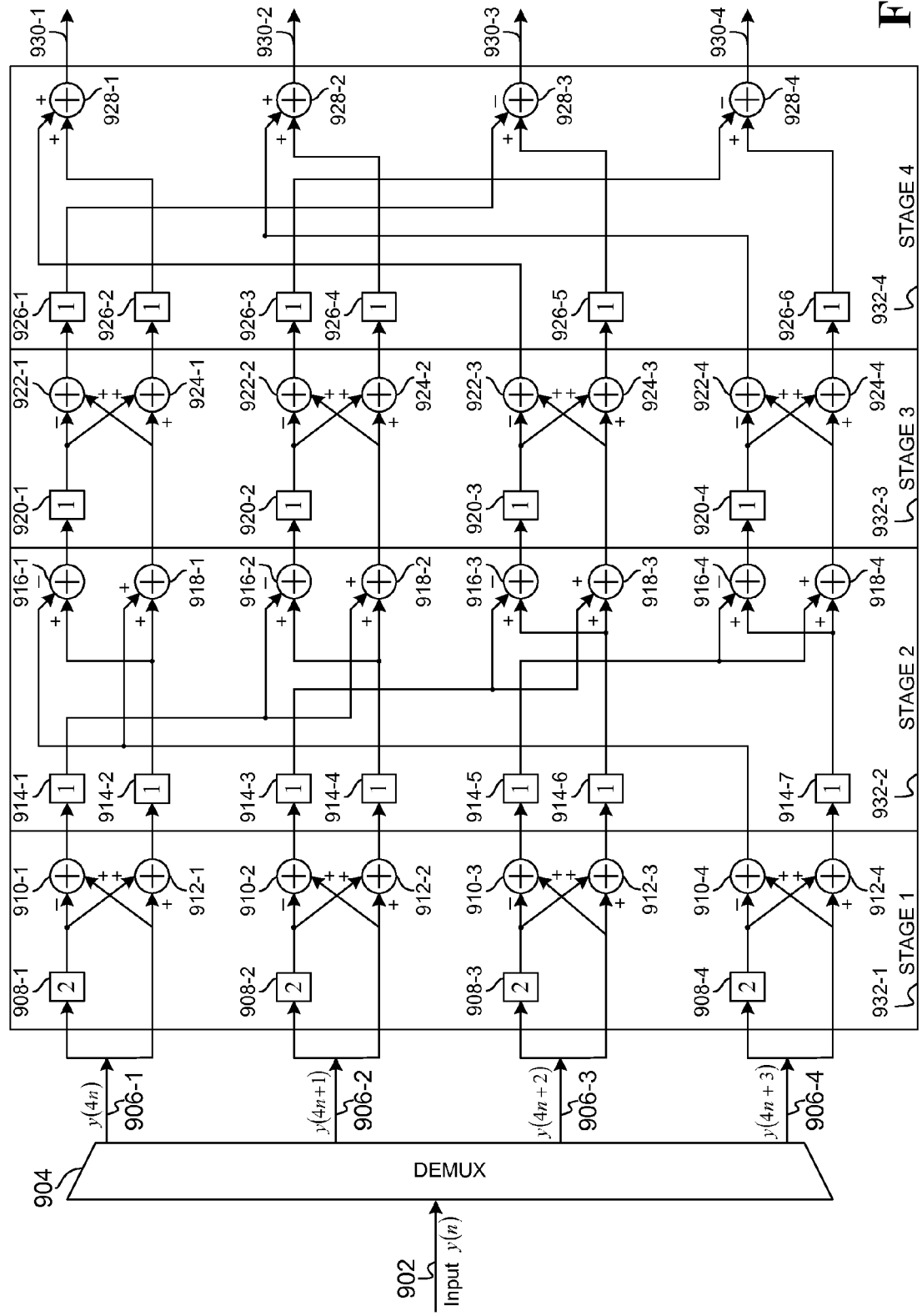
FIG. 9 illustrates an example generalized efficient parallel Golay correlator that may be used within a wireless communication system in accordance with certain aspects of the present disclosure.

Performing a polyphase decomposition of the above equations, using four phases, we obtain the circuit shown in FIG. 9. First four phases decomposition is applied to input signal 902. This is achieved using a demultiplexer 904 and the outputs 906-1 to 906-4 are the four phases of input signal $y(n)$. If samples of the input signal 902 are incoming at a speed CLK, than each of signals 906-1 to 906-4 will be running at quarter the speed, i.e. at CLK/4. The first stage 932-1 computes the four phases of the partial correlation signals $P_1(z)$ and $Q_1(z)$. The delay $z^{-8}$ becomes a delay of 2 in the four phase decomposition. Therefore, memory components 908-1 to 908-4 comprise two delay elements each. The output of the delay elements along with the four phases of the input signal, i.e. 906-1 to 906-4, are input to subtractors 910-1 to 910-4 and adders 912-1 to 912-4. The outputs of the subtractors 910-1 to 910-4 are the four phases of signal $p_1(n)$ and the outputs of the adders 912-1 to 912-4 are the four phases of signal $q_1(n)$. The second stage 932-2 computes the four phases of signal $p_2(n)$ and $q_2(n)$. This stage contains memory components 914-1 to 914-7 comprising a single delay element each, subtractors 916-1 to 916-4, and adders 918-1 to 918-4. The interconnections between the output of delay components 914-1 to 914-7 and subtractors 916-1 to 916-4, and adders 918-1 to 918-4 correspond to the polyphase decomposition of matrix $$\begin{bmatrix} -z^{-1} & 1 \\ z^{-1} & 1 \end{bmatrix}$$

The third stage computes the four phases of signal $p_3(n)$ and $q_3(n)$ using memory components 920-1 to 914-4 comprising a single delay element each, subtractors 922-1 to 922-4, and adders 924-1 to 924-4. Like stage 1, the interconnections here between memory component 920-1 to 920-4 and subtractors 922-1 to 922-4, and adders 924-1 to 924-4 do not involve signals from other phases, i.e. subtractor 922-1 and adder 922-1 for the first phase for example do not use any signals from 920-2, 920-3 and 920-4 that is memory components from phases 2, 3, and 4. This is because the delay in the multiplication $$\begin{bmatrix} P_3(z) \\ Q_3(z) \end{bmatrix} = \begin{bmatrix} -z^{-4} & 1 \\ z^{-4} & 1 \end{bmatrix} \begin{bmatrix} P_2(z) \\ Q_2(z) \end{bmatrix}$$

is $z^{-4}$ and therefore no interconnections between the different phases is required. Finally, the fourth stage computes the four phases of the desired output $p_4(n)$. This stage comprises delay components 926-1 to 926-6 comprising a single delay element and adders 928-1 to 928-4. The outputs 930-1 to 930-4 are four phases of the desired output $p_4(n)$.

Therefore, according to one aspect of the disclosure, a received spread data stream may be despread using a generalized efficient parallel Golay correlator/matched filter.

Wireless Body Area Networks

WBAN (Wireless Body Area Networks) consists of SC (Single Carrier) mobile sensors, either wearable or implanted into the human body, which monitor vital body parameters and movements. These devices, communicating through SC wireless technology (such as CDMA), transmit data from the body to a home base station, from where the data can be forwarded to a health center, hospital, clinic, or elsewhere, real-time.

The sensors/wireless devices used in WBAN would have to be low in complexity, small in form factor, light in weight, very power efficient, and easily configurable.

The battery life in WBAN devices is expected to be very long; therefore there is a need in the art for power efficient single carrier system.

Furthermore, the low cost WBAN stations (devices) would have to use low cost crystals with high ppm (parts per million) on the frequency uncertainty, and may even be crystal-less and therefore have even higher ppm. As an example, a STA with 100 ppm operating in the 2.4 GHz unlicensed band, will have an LO (local oscillator) frequency drift by up to 240 KHz from the center frequency. Therefore two communicating STAs might be off by up to 480 KHz with respect to each other, and devices has to be able to decode signals with such large frequency offsets with little loss in performance.

When detected coherently, spread spectrum sequences might perform poorly due to the high frequency drift between two STAs, therefore there is a need in the art for spread spectrum sequences that are resilient to high frequency errors between communicating devices.

Constant Envelope Modulation

In accordance to one aspect of the disclosure, the spread spectrum SC data stream is CPM modulated and the transmitted data stream is constant envelope.

According to one aspect of the disclosure, a 2-CPM (Continuous Phase Modulation) signal with binary alphabet and modulation index $h_2$ may be generated using filtered differentially encoded $\pi h_2$-continuously rotated differential pseudo BPSK (Binary Phase Shift Keying) modulated signal, referred to here as $\pi h_2$–DPBPSK (Differential Pseudo BPSK) and further detailed below. The filtered $\pi h_2$–DPBPSK is an approximation to a 2-CPM and has a quasi-constant envelope. The $\pi h_2$ continuous rotation means that the $k^{th}$ symbol is rotated by $k\pi h_2$, where a symbol is a single chip.

The CPM modulation family includes CPFSK (Continuous Phase Frequency Shift Keying), and special cases of MSK (Minimum shift Keying), GMSK (Gaussian Minimum Shift Keying), GFSK (Gaussian Frequency Shift Keying).

According to one aspect of the disclosure, the 2-CPM modulation is a 2-GMSK (Gaussian Minimum shift Keying), also known as 2-GFSK (Gaussian Frequency shift Keying).

According to one aspect of the disclosure, a 2-CPM modulator as shown in FIG. 10A with binary input $\{d(k)\}$ drawn for the alphabet $\{0,1\}$ (i.e. input 1002) and complex output 1006, may be implemented as shown in FIG. 10B. The binary input data stream 1022, i.e. $\{d(k)\}$ (Which corresponds to input 1002 in FIG. 10A) is input to a pseudo-BPSK constellation mapper block which outputs the pseudo-BPSK signal 1026 given by $I(k)=\exp[-j2\pi h_2 d(k)]$. Signal 1026 is termed here pseudo-BPSK since it belongs to the following constant amplitude alphabet $\{1, \exp[-j2\pi h_2]\}$ (corresponding to d(k)=0, and d(k)=1), and in the special important case where the modulation index is $h_2=1/2$, signal pseudo-BPSK becomes exactly BPSK with alphabet $\{\pm 1\}$.

The pseudo-BPSK signal 1026 is differentially encoded in 1028 and the output is a DPBPSK (Differentially encoded Pseudo-BPSK) signal denoted here A(k) and computed as follows $$A(k)=A(k-1)I(k), K=0, 1, 2, \ldots \text{ with } A(-1)=1$$

The differential encoding operation is further illustrated in FIG. 10C where output signal A(k) in 1068 is generated by multiplying the former output A(k-1) initialized to 1 in 1072 by input I(k) in 1062. In the special case where the modulation index is $h_2=1/2$, the output signal 1030 becomes DBPSK (Differentially encoded BPSK).

The DPBPSK signal A(k) in 1030 is continuously rotated by $\pi h_2$, that is the first chip (symbol) is rotated by zero radians, the second chip is rotated by angle $\pi h_2$ radians, the third chip is rotated by angle $2\pi h_2$ radians and so on. This is further illustrated in FIG. 10D, where the DPBPSK input signal 1082 is rotated using multiplier 1086 by 1084 to produce output 1088 denoted B(k) as follows $$B(k)=A(k)\exp(jk\pi h_2)$$

For the special case where the modulation index is $h_2=1/2$, the signal B(k) at the output of 1034 is known in the literature as $\pi/2$–DBPSK and may be generated in many different ways. For this special case, even symbols B(2k) take on the following values $\{\pm 1\}$, whereas odd symbols B(2k+1) take on the following values $\{\pm j\}$. Therefore in conclusion, blocks 1024, 1028, and 1032 provide an example implementation of $\pi h_2$-DPBPSK modulation and in the special case where the modulation index is $h_2=1/2$, this reduces to the known $\pi/2$-DBPSK modulation.

The $\pi h_2$-DPBPSK modulated complex signal 1034 is input to I&Q filters in 1036 where the I component (i.e. in-phase or real part) is filtered by a first filter g(t) and the Q component (i.e. quadrature or imaginary part) is filtered by a second filter that is preferably identical to the first filter g(t), and the complex output 1038 is referred to as filtered $\pi h_2$-DPBPSK and labeled as x(t).

Therefore, according to one aspect of the disclosure, the output signal may be expressed as a quasi-constant envelope linearly modulated signal with $\pi h_2$-DPBPSK constellation points, $$x(t) = \sum_k B(k)g(t - kT)$$

where T is the chip duration. The filter g(t) may be implemented in digital or analog. As an example, a Bessel filter, a Butterworth filter, a Chebyshev filter, or an elliptic analog filter may be used. In a preferred embodiment of the invention, the filters are designed in such a way that the complex signal x(t) has a quasi-constant envelope. The filtering is preferably chosen to provide a quasi-envelope signal.

According to one aspect of the disclosure, a 2-CPM signal with binary alphabet and modulation index $h_2=1/2$ as shown in FIG. 11A may be generated using a filtered $\pi/2$-BPSK modulation as shown in FIG. 11B.

FIG. 11B is a special case of FIG. 10B. Since the pseudo-BPSK becomes exact BPSK in this case, it is possible to differential encode the signal first as shown in 1124 and then apply a BPSK mapping as shown in 1128.

The differential encoding may be implemented as shown in FIG. 11C wherein the binary input stream 1162 is XORed in 1164 with delayed output 1172. The output stream 1168 takes on logic levels "0" and "1" and is stored in memory element 1170 to provide the feedback signal 1172. The memory element 1170 may be implemented as a single flip-flop for example.

The DBPSK signal 1130 is continuously rotated by $\pi/2$ as shown in FIG. 11D, where the $k^{th}$ input DBPSK chip is rotated by $k\pi/2$ radians. Therefore, even number chips (i.e. chips number 0, 2, 4, . . . ) may take on the values +1 and -1, whereas odd chips (i.e. chips number 1, 3, 5, . . . ) may take on the values +j and -j. A $\pi/4$ rotation (not shown in the FIG. 11B) may be applied to the $\pi/2$-DBPSK signal 1134 before being input to 1136. The $\pi/4$ rotation maps for level +1 to +1+j, +j is mapped to -1+j, -1 is mapped to -1-j and finally -j is mapped +1-j.

According to one aspect of the disclosure, a 2-CPM signal with a modulation index of $h_2=1/2$ at the output of 328' in FIG. 3. after traveling through the multipath channel 334 and down-converted to baseband may be modeled as a regular linear modulation with $\pi h_2$-DPBPSK constellation through a linear multipath channel as follows at time t=nT where T is the chip duration $$r(n) = \left[ j^n \sum_{k=0}^{L} h(k)A(n-k) \right] e^{j2\pi nfT} + DC + w(n)$$

where h (k) is the channel of length L+1 chips as seen by the receiver and comprises the cascade of the transmit filter, multipath channel, and receive filter, $\{A(n)\}$ are the differentially encoded BPSK chips (with values $\pm 1$) related to the information chips $\{I(n)\}$ by differential encoding, i.e. $A(n) = A(n-1)I(n)$, f is the frequency offset between the transmitter and receiver due to ppm drift on both sides and Doppler shift, DC is constant offset which may be present in direct conversion receivers, and w (n) is the additive white Gaussian noise plus interference. Not shown in the above equation is the time drift which may be modeled as a slowly time varying channel. For an arbitrary modulation index, the above equation becomes $$r(n) = \left[ e^{jn\pi h_2} \sum_{k=0}^{L} h(k)A(n-k) \right] e^{j2\pi nfT} + DC + w(n)$$

After DC removal, frequency correction, and continuous $\pi h_2$-de-rotation, the received signal takes the following form $$y(n) = \sum_{k=0}^{L} h(k)A(n-k) + w(n)$$

And any linear data detection method may be used to recover the transmit data stream $\{I(n)\}$. As an example, differential detection, MLSE (Maximum Likelihood Sequence Estimation) receiver, DFE (Decision feedback Equalizer), MMSE (Minimum Mean Square Equalizer), may be used to recover the transmit data stream.

In order to increase the data rate within a given bandwidth, 4-CPM may be used instead of 2-CPM. The complex envelope of a 4-CPM signal may be represented mathematically by the following form $$x(t) = \exp\left[ j2\pi h_4 \sum_k I(k)q(t - kT) \right]$$

where T is the chip duration, $h_4$ is the modulation index, $\{I(k)\}$ are the information symbols in the 4-ary alphabet $\{\pm 1, \pm 3\}$, and q(t) is the phase response of the system with q(MT)=1/2 for some integer M>0. The peak frequency deviation $f_d$ is related to the modulation index $h_4$ by the following formula $f_d=h_4/(2T)$. The information symbols $\{I(k)\}$ may themselves be generated from input binary data stream $\{d(k)\}$ using gray mapping as shown below

| d(2k) | d(2k + 1) | I(k) |
|---|---|---|
| 0 | 0 | +1 |
| 1 | 0 | +3 |
| 1 | 1 | -3 |
| 0 | 1 | -1 |

The gray mapping may be alternatively expressed as follows $I(k)=[1+2d(2k)][1-2d(2k+1)]$ A 2-CPM signal may be represented by the same above equation with the exception that the information symbols $\{I(k)\}$ are from a 2-ary alphabet $\{\pm 1\}$ and the modulation index is denoted as $h_2$. The information symbols $\{I(k)\}$ are related to input signed binary data stream $\{d(k)\}$ by $I(k)=d(k)$.

Generation of a 4-CPM signal is complex since 4-CPM modulation is highly non-linear modulation and requires the computation of the cosine of the phase $\phi(t)=2\pi h_4 \Sigma_k I(k)q(t-kT)$ for the in-phase component and the sine of the phase $\phi(t)$ for quadrature component and the use of high resolution (multi-bits) DACs. Therefore, there is a need in the art for an efficient linear representation and generation of 4-CPM modulation.

Figure 12A:
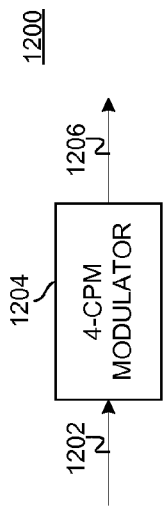
FIG. 12A illustrates a 4-CPM modulator with an arbitrary modulation index used to modulate the data stream to be transmitted.
Figure 12B:
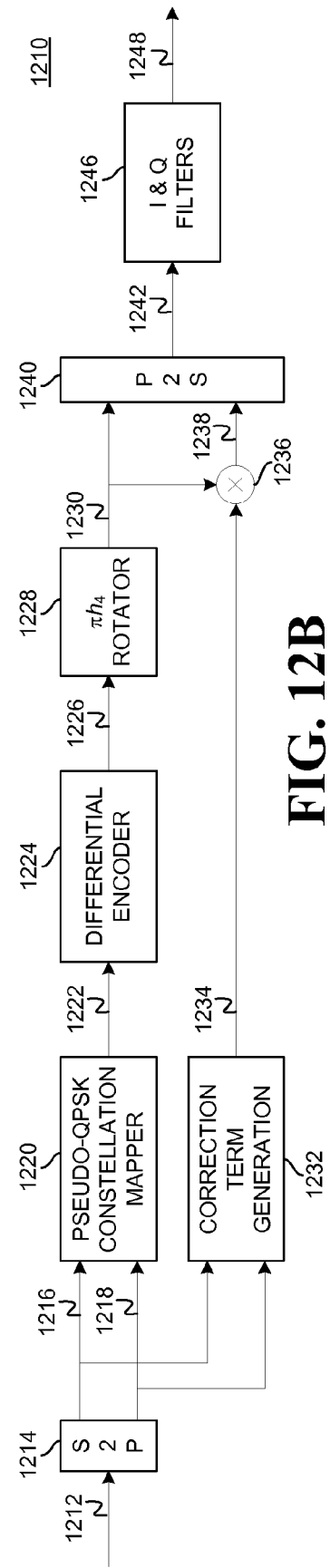
FIG. 12B illustrates an alternative implementation of a 4-CPM modulator in accordance with certain aspects of the present disclosure.

According to another aspect of the disclosure, a 4-CPM (such as 4-GMSK/4-GFSK) signal may be generated using a quasi-constant envelope filtered generalized differentially encoded $\pi h_4$-continuously rotated QPSK (Quadrature Phase Shift Keying) modulated signal, referred to here as $\pi h_4$-GDPQPSK as detailed below. The $\pi h_4$ continuous rotation means that the $k^{th}$ chip is rotated by $k\pi h_4$. This linear representation of 4-CPM simplifies the receiver design tremendously we shall see later. Therefore, according to one aspect of the disclosure, the 4-CPM modulator in FIG. 12A may be implemented as shown in FIG. 12B according to one aspect of the disclosure.

The input binary data stream $\{d(k)\}$ in 1212 from the alphabet $\{0, 1\}$ is parallelized in the S2P (Serial To Parallel) block 1214, and the output 1216 corresponds to even bits $\{d(2k)\}$ whereas output 1218 corresponds to odd bits $\{d(2k+1)\}$. The two bit streams 1216 and 1218 are input to a gray-coded pseudo-QPSK constellation mapper block 1220 which outputs pseudo-QPSK signal 1222 written as $J(k)=\exp\{j\pi h_4[I(k)-1]\}$ with $I(k)=[1+2d(2k)][1-2d(2k+1)]$ The signal is termed here pseudo-QPSK since the output 1222, i.e. $J(k)$ belongs to the following constant amplitude alphabet $\{1, \exp[\pm j2\pi h_4], \exp[-j4\pi h_4]\}$ and in the special where modulation index is $h_4=1/4$, the signal 1222 becomes exact QPSK with alphabet $\{\pm 1, \pm 1\}$.

Figure 12C:
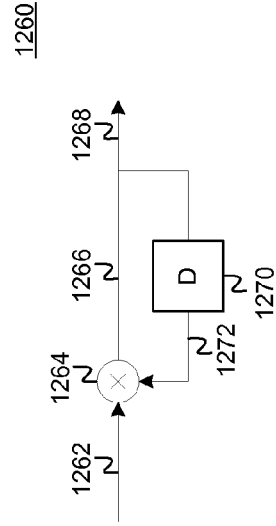
FIG. 12C illustrates a differential encoder used as a part of the alternative 4-CPM modulator of FIG. 12B.

The pseudo-QPSK signal 1222 is differentially encoded in 1224 and the output 1226 is a DPQPSK (Differentially encoded Pseudo-QPSK) signal denoted here $A(k)$ and computed as follows $A(k)=A(k-1)J(k), k=0, 1, 2, \ldots$ with $A(-1)=1$ The differential encoding operation is further illustrated in FIG. 12C which operates in the same way as described for FIG. 10C. In the special case where the modulation index is $h_4=1/4$, the output signal 1226 is DQPSK (Differentially encoded QPSK).

Figure 12D:
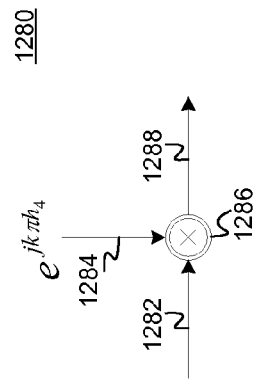
FIG. 12D illustrates a continuous chip rotator used as a part of the alternative 4-CPM modulator of FIG. 12B.

The DPQPSK signal $A(k)$ in 1226 is continuously rotated by $\pi h_4$, that is the first chip is rotated by angle zero, the second chip is rotated by angle $\pi h_4$ radian, the third chip is rotated by angle $2\pi h_4$ radian and so on. This is further illustrated in FIG. 12D, where DPQPSK input signal 1282 is rotated by 1284 using multiplier 1286 to produce rotated output 1288 denoted B (k) and expressed as follows $B(k)=A(k)\exp(jk\pi h_4)$ For the special case where the modulation index is $h_4=1/4$, the signal $B(k)$ at the output of 1228 is known in the literature as $\pi/4$–DQPSK and may be generated in many different ways. For this special case, even symbols $B(2k)$ take on the following values $\{\pm 1, \pm j\}$, whereas odd symbols $B(2k+1)$ take on the following values $\{\exp(\pm j \pi/4), \exp(\pm j 3\pi/4)\}$. Therefore in conclusion, blocks 1114, 1124, 1132, and 1136 provide an example implementation of $\pi h_4$–DPQPSK modulation and in the special case where the modulation index is $h_4=1/4$, this reduces to the known $\pi/4$–DQPSK modulation.

According to one aspect of the invention, a generalized $\pi h_4$–DPQPSK, labeled here $\pi h_4$–GDPQPSK may be used to represent 4-CPM. An example illustration of the embodiment for generation of $\pi h_4$–GDPQPSK is shown in blocks 1232, 1236 and 1240. The input bit streams bit $d(2k)$ and $d(2k+1)$ in 1216 and 1218 are input to block 1232 which generates a correction term 1234 according to the following formula $$C(k) = \alpha \left\{ \begin{array}{c} \exp[j\pi h_4[1-2d(2k)][1-2d(2k+1)]] + \\ \exp[-j2\pi h_4[1-2d(2k+1)]] \end{array} \right\}$$

where $\alpha$ is a constant that depends on the modulation index $h_4$. As an example, for a modulation index $h_4=1/4$, the constant $\alpha$ is in the order of 0.47 and for a modulation index $h_4=1/6$, the constant $\alpha$ is in the order of 0.42.

The correction term 1234, i.e. $C(k)$, is multiplied by $\pi h_4$–DPQPSK signal 1230, i.e. signal $B(k)$, to generate signal 1238 referred to here as a modified $\pi h_4$–DPQPSK signal and labeled $\pi h_4$–MDPQPSK. The $\pi h_4$–MDPQPSK signal is denoted as $D(k)$, and is computed as follows $D(k)=C(k)B(k)$, for $k=0, 1, 2,$ The $\pi h_4$–DPQPSK signal 1138, i.e. $B(k)$, and the $\pi h_4$–MDPQPSK signal, i.e. $D(k)$, are serialized using the P2S (Parallel To Serial) block 1144, and the output 1146 is referred to here as the generalized $\pi h_4$–DPQPSK, labeled as $\pi h_4$–GDPQPSK and denoted $E(k)$, $E(2k-1)=D(k)$ $E(2k)=B(k)$ The $\pi h_4$–GDPQPSK signal $E(k)$ is complex and the samples are separated by $T/2$, i.e. half a symbol due to the serialization operation 1240. The complex signal $E(k)$ is input to I&Q filters in 1246 where the I component (i.e. in-phase or real part) is filtered by a first filter and the Q component (i.e. the quadrature or imaginary part) is filtered by a second filter that is preferably identical to the first filter, and the complex output 1248 is referred to as filtered $\pi h_4$–GDPQPSK and labeled as $x(t)$ which reduces to $\pi h_4$–GDQPSK in the important special case where $h_4=1/4$. The output signal 1248 is a quasi-constant envelope signal and may be expressed as $$x(t) = \sum_k E(k)g(t-kT/2)$$

where $g(t)$ is a real filter identical to the in-phase and quadrature filters. The filter $g(t)$ may be implemented in digital or analog. As an example, a Bessel filter, a Butterworth filter, a Chebyshev filter, or an elliptic filter may be used. In a preferred embodiment of the invention, the filters are designed in such a way that the complex signal $x(t)$ has a quasi-constant envelope. The filter $g(t)$ is preferably chosen to produce a quasi-constant envelope signal.

According to another aspect of the disclosure, a CPM signal (including 2-CPM and 4-CPM) signal may be generated using filtered differentially encoded $\pi h$-continuously rotated Pseudo-PSK (Phase Shift Keying) modulation, wherein the differentially encoded $\pi h$-continuously rotated Pseudo-PSK is $\pi h_2$–DPBPSK for a 2-CPM signal and wherein the differentially encoded continuously rotated πh-Pseudo-PSK is $\pi h_4$–GDPQPSK for a 4-CPM signal. Therefore, a CPM signal may be generated using filtered differentially encoded πh-Pseudo-PSK according to one aspect of the invention.

When the multipath channel is much smaller than the chip duration, a 4-CPM signal may be detected non-coherently but at a reduced performance as compared to a coherent detection receiver. On the other hand, when the multipath channel is significant, coherent or non-coherent detection of 4-CPM becomes extremely difficult due to the non-linear nature of 4-CPM. Therefore, there is a need in the art for a practical coherent detection method and a practical non-coherent detection method in a multipath environment. Even when the multipath channel is not significant, there is a need in the art for a practical coherent detection method.

According to one aspect of the disclosure, the 4-CPM signal at the output of 328' in FIG. 3. after traveling through the multipath channel 334 and down-converted to baseband but before digitization may be modeled as follows $$r(t) = \left[\sum_k E(k)p(t-kT/2)\right]e^{j2\pi ft} + DC + w(t)$$

where p(t) is the channel as seen by the receiver and comprises the cascade of the transmit filtering, multipath channel, and receive filtering, {E(k)} are the transmit $\pi h_4$–GDPQPSK data chips, f is the frequency offset between the transmitter and receiver due to ppm drift on both sides and Doppler shift, DC is constant offset which may be present in direct conversion receivers, and w(t) is the additive white Gaussian noise plus interference. Not shown in the above equation is the time drift which may be modeled as a slowly time varying channel.

The received signal may be sampled at one sample per chip or multiple samples per chip. As an example, for a two samples per chip system, the received signal at time t=nT–T/2, labeled here as $r^{(0)}(n)$, and the received signal at time t=nT, labeled here as $r^{(1)}(n)$, may be expressed as (after DC removal, frequency correction, and $\pi h_4$ continuous de-rotation)

$$r^{(0)}(n) = e^{-j\pi h_4}\sum_{k=0}^{L} h^{(1)}(k)A(n-k-1) + \sum_{k=0}^{L} h^{(0)}(k)F(n-k) + w^{(0)}(n)$$

$$r^{(1)}(n) = \sum_{k=0}^{L} h^{(0)}(k)A(n-k) + \sum_{k=0}^{L} h^{(1)}(k)F(n-k) + w^{(1)}(n)$$

Where {A(n)} is the set of DPQSK chips shown above, {F(n)} is the set of MDPQSK chips related to {A(n)} via the correction terms as follows $$F(n)=A(n)C(n) \text{ for } n=0, 1, 2,$$

and where $$h^{(0)}(k)=p(kT)e^{-jk\pi h_4}, \text{ and } h^{(1)}(k)=p(kT+T/2)e^{-jk\pi h_4}$$

The transmit data stream may be estimated from $r^{(0)}(n)$ alone; $r^{(1)}(n)$ alone or by using jointly $r^{(0)}(n)$ and $r^{(1)}(n)$. The above equations are similar to any linear oversampled system such as π/4–DQPSK with the exception that the data symbols are drawn from a different constellation, i.e. $\pi h_4$–GDQPSK constellation. Therefore, any data detection method may be used to recover the transmit data stream {I(n)}. As an example, MLSE (Maximum Likelihood Sequence Estimation) receiver, DFE (Decision feedback Equalizer), MMSE (Minimum Mean Square Equalizer), differential detection, may be used to recover the transmit data stream.

In order to estimate the multipath channel at the receiver a training sequence is typically used that is known at both sides, i.e. at the transmitter and receiver. Training 4-CPM in a multipath environment is extremely challenging due to the fact that 4-CPM is a non-linear modulation. Therefore, there is a need in the art for a practical training method that allows easy channel estimation.

According to one aspect of the disclosure, the 4-CPM received signal after being digitized is modeled as a $\pi h_4$–GDQPSK linearly modulated signal and therefore a $\pi h_4$–GDQPSK training sequence may be used at the transmitter side to train the receiver and permits multipath channel estimation using known correlation methods. As an illustration example, for a 4-CPM system with a modulation index of $h_4=1/4$, the following training sequence may be used $$I=[-3,+3,+1,+3,-3,+3,-3,-1,-3,+3]$$

which corresponds to the binary sequence $$d=[1,1,0,0,1,0,0,0,1,1,0,0,1,1,0,1,1,10,0]$$

Figure 13A:
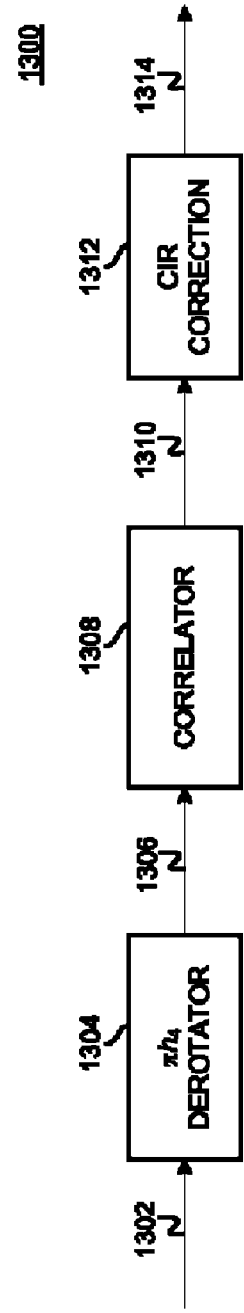
FIG. 13A illustrates a channel impulse response estimator in accordance to one aspect of the disclosure.
Figure 13B:
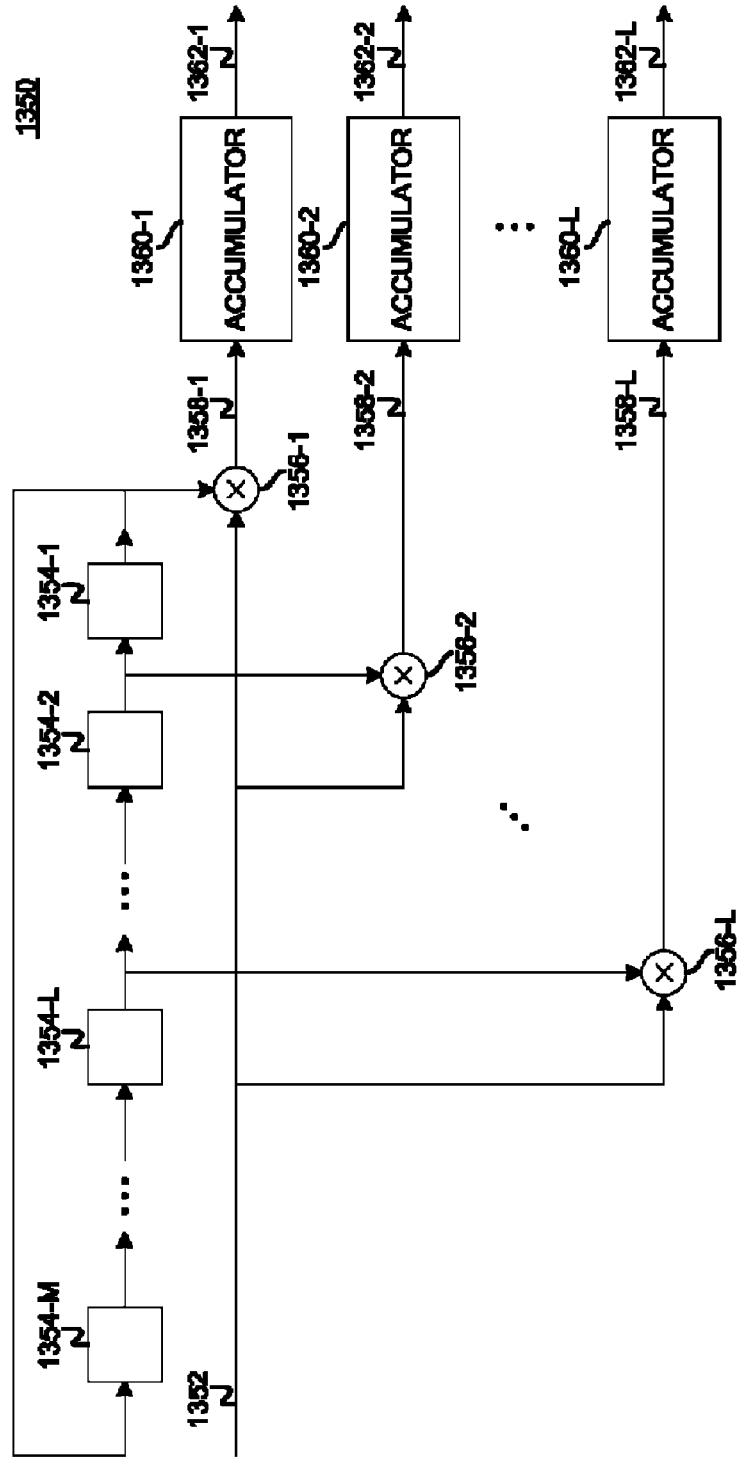
FIG. 13B illustrates an example implementation of the correlator used in FIG. 13A.

According to one aspect of the disclosure, the channel may be estimated as shown in FIG. 13A. The received training sequence 1302 is first continuously de-rotated by $\pi h_4$ in de-rotator 1304, and the de-rotated output 1306 is input to correlator 1308. The correlator may be implemented as a matched filter to the entire training sequence or to a part of the training sequence, i.e. matched filter to A(i: 11–i) where i≧1. Matched filter operation implements a convolution between input 1306 and A*(11–n) where A*(11–n) the reverse and conjugate of sequence is A(n). The sequence A(n) is computed as explained above and repeated below $$A(k)=A(k-1)J(k), \text{ with } A(-1)=1 \text{ and } k=0, 1, 2, J(k)=\exp\{j\pi h_4[I(k)-1]\}$$

For an oversampled received signal as explained above, the matched filter is a filter matched to the sequence {A (i), F(i), A(i+1), F(i+1), . . . , A(M–i), F(M–i)} where M=11 in the above example.

According to another aspect of the disclosure, the correlation may be implemented as shown in FIG. The shift register 1354-1 to 1354-M is loaded with the part or entire sequence {A*(n)}. As an example, memory component 1354-1 is loaded with A*(2), and memory component 1354-2 is loaded with A*(3) and so on. The shift register is a cyclic shift register, i.e. at each clock cycle, the content shifts one position to the right and the output of 1354-1 is fed back to 1354-M. The received signal corresponding to the training sequence 1352 is input to multipliers 1356-1 to 1356-L along with the outputs of memory components 1354-1 to 1354-L respectively. The multipliers outputs 1358-1 to 1358-L are input to accumulators 1360-1 to 1360-L. Each accumulator accumulates its output over M clock cycles where M is the total or partial length of sequence {A*(n)}. The outputs 1362-1 to 1362-L may be serialized to provide a coarse estimate of the CIR (Channel Impulse Response).

The channel impulse response 1310 may not be perfect due to the fact that there are no training sequences that provide zero correlation zone (i.e. zero sidelobes) around the peak. Therefore, according to one aspect of the disclosure, the coarse CIR 1310 is input to a CIR correction unit 1312 that provides an improved CIR estimate. The CIR correction unit may be implemented using know sidelobe suppression methods such as matrix inversion.

As an example, consider the estimation of a CIR of 3 taps. For the training sequence provided above, if the system is oversampled by a factor of two and a matched filter to the sequence {A(2), F(2), A(3), F(3), . . . , A(10), F (10)} is used than the coarse CIR estimate x=[x(0), x(1), x(2)] at the output of 1308 in FIG. 13A is given by $$x(0)=h(0)+0.42\times h(1)$$

$$x(1)=0.42\times h(0)+h(1)+0.42\times h(2)$$

$$x(2)=0.42\times h(1)+h(2)$$

where h=[h(0), h(1), h(2)] is the desired clean CIR, and where the 0.42 value correspond to the first sidelobe level of the autocorrelation function at the output of the matched filter. The coarse CIR x may be corrected in 1312 using matrix inversion as follow $$\begin{bmatrix} h(0) \\ h(1) \\ h(2) \end{bmatrix} = \begin{bmatrix} 1 & 0.42 & 0 \\ 0.42 & 1 & 0 \\ 0 & 0.42 & 1 \end{bmatrix}^{-1} \times \begin{bmatrix} x(0) \\ x(1) \\ x(2) \end{bmatrix}$$

which provides a cleaner estimate 1314 of the CIR.

Constant Envelope Preambles

As mentioned above, single carrier WBAN systems are envisioned to use low cost crystals with high ppm (parts per million) and may even be crystal-less with even higher ppm. In order to detect the presence of the signal, a preamble (i.e. a known signature) is typically sent by a transmitter device as part of each packet. Coherent detection of the preamble may become problematic in the presence of large frequency offsets due to the high ppm on each side of a link and therefore, there is a need in the art for a robust preamble design and detection method while still maintains a constant envelope.

In accordance to another aspect of the disclosure, at least one of a Golay spreading sequence and a generalized-Golay spreading sequence with zero DC level after differential encoding and continuous chip-level $\pi h_2$-rotation is 2-CPM (Continuous Phase Frequency Shift Keying) modulated and used to spread at least a portion of a data stream. This is illustrated in FIGS. 14A and 14B and detailed below for the exemplary case of 2-CPM with $h_2=1/2$.

Figure 14A:
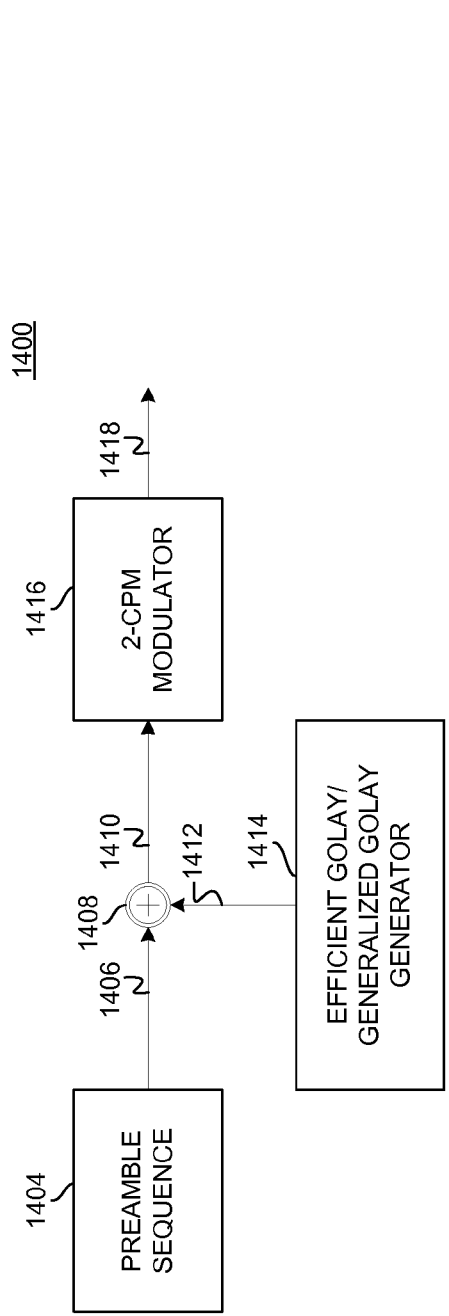
FIG. 14A illustrates a 2-CPM spread preamble according to one aspect of the disclosure.

According to one aspect of the disclosure, as illustrated in FIG. 14A, a preamble sequence 1406 such as sequence [0, 0, . . . , 0, 1] is generated in 1404 and is spread in 1408 using a XOR gate with a spreading sequence generated using an efficient Golay/Generalized-Golay generator 1414 which may be implemented as shown in FIGS. 4A, 4B, 5A, and 6B. As an example, for a Golay sequence of length 16, $a_{16}$, with elements from the alphabet {0,1}, the spread preamble 140 would be $[a_{16}, a_{16}, \ldots, a_{16}, \bar{a}_{16}]$ where $\bar{a}_{16}=1-a_{16}$, i.e. a logic "0" becomes "1" and logic "1" becomes "0". The spread preamble 1410 is 2-CPM modulated in 1416 and transmitted as part of a packet.

Figure 14B:
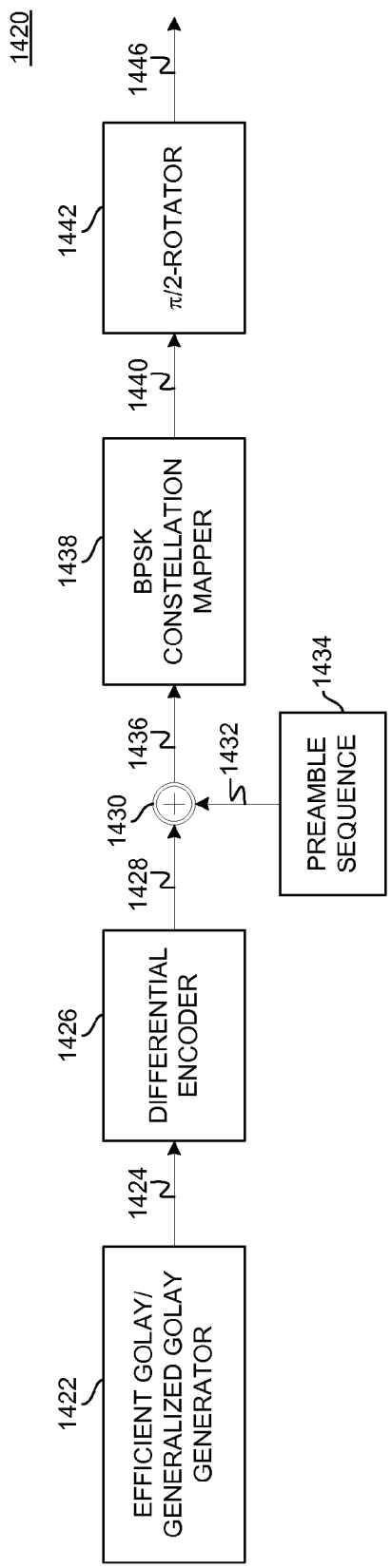
FIG. 14B illustrates an alternative implementation of a 2-CPM spread preamble according to one aspect of the disclosure.

According to another aspect of the disclosure, the 2-CPM modulated preamble with modulation index of $h_2=1/2$ may be generated as shown in FIG. 14B. A Golay/Generalized-Golay sequence is generated using the efficient generator 1422 which is differentially encoded in 1426 and the output 1428 is a differential Golay sequence or a differential generalized-Golay sequence. The differential sequence 1428 is used to spread a preamble sequence 1433 generated in 1434 and the spread preamble 1436 is mapped to a BPSK constellation, i.e.

logic level "0" is mapped to +1 and logic level "1" is mapped to −1. The BPSK preamble is continuously rotated by π/2 in rotator 1442. The preamble and the remainder of the packet (not shown in FIG. 14B) is filtered conditioned, up-converted to the appropriate RF frequency, amplified and transmitted.

In the following, a differential Golay sequence is defined as a differentially encoded Golay sequence, and a differential generalized-Golay sequence is defined as a differentially encoded generalized Golay sequence.

In the following, an example of a differential Golay code (or sequence) at the output of 1426 in according to one aspect of the disclosure is provided. First, a Golay code a of length N=16 can be generated using delay vector D=[4, 8, 1, 2] and seed vector W=[+1, −1, −1, +1]:

$$a=[-1,-1,-1,-1,-1,+1,-1,+1,+1,+1,-1,-1,-1,-1,+1,+1]$$

Or using logic levels "0" and "1"

$$a=[1,1,1,1,1,0,1,0,0,0,1,1,1,1,0,0]$$

The differential Golay code used as a spreading sequence, denoted here c, is generated using the following formula (block 1426 in FIG. 14B)

$$c(0)=a(0)$$

$$c(n)=c(n-1)\oplus a(n) \text{ for } n=1,\ldots,N-1$$

where "mod" stands for modulo operation, i.e. −1 mod N=N−1, and $\oplus$ stands for XOR operation. This yield $$c=[1,0,1,1,0,1,1,0,1,1,1,1,1,0,0,0]$$

The spreading sequence c is not a Golay sequence, but rather, its differential a is a Golay sequence. The Golay sequence a can be computed from sequence c using chip differential operation as follows $$a(n)=c(n)\oplus c((n-1)\bmod N) \text{ for } n=0, 1, \ldots, N-1$$

where "mod" stands for modulo operation, i.e. −1 mod N=N−1. It should be noted that when BPSK levels +1 and −1 are used instead of logic levels "0" and "1" in sequences a and c, the differential encoding becomes $$c(0) = a(0)$$

$$c(n) = c(n-1) \times a(n) = \prod_{k=0}^{n} a(k) \text{ for } n = 1, \ldots, N-1$$

And the differential decoding becomes $$a(n)=c(n)\times c((n-1)\bmod N) \text{ for } n=0, 1, \ldots, N-1$$

According to one aspect of the disclosure, the Golay or generalized-Golay sequence used to spread the preamble has a zero DC level after differential encoding and π/2 rotation. The DC level of the differential Golay sequence after π/2-rotation is $$DC = \sum_{n=0}^{N-1} e^{jn\pi h_2}[1 - 2c(n)] = 0$$

where j is the complex number defined by $j=\sqrt{-1}$, and the elements of the sequence {c(n)} are from the alphabet {0,1}. Therefore, the $\pi h_2$-rotated differential Golay sequence is DC free. A DC free sequence is advantageous since it enables DC offset removal at the receiver before and/or after detection and enables multiple RF radio implementations such as direct conversion receiver.

The DC offset may be calculated from the equivalent signed sequence {c(n)}, i.e. when the elements are taken from the alphabet {±1} as follows $$DC = \sum_{n=0}^{N-1} e^{jn\pi/2} c(n) = \sum_{n=0}^{N-1} e^{jn\pi/2} \prod_{k=0}^{n} a(k) = 0$$

According to one aspect of the disclosure, the Golay or generalized-Golay sequence used to spread the preamble has a zero DC level after DPBPSK (Differential Pseudo BPSK) encoding and $\pi h_2$ rotation. The DC level of the DPBPSK Golay sequence {c(n)} after $\pi h_2$ rotation is $$DC = \sum_{n=0}^{N-1} e^{jn\pi h_2} c(n) = \sum_{n=0}^{N-1} e^{jn\pi h_2} \prod_{k=0}^{n} e^{j\pi h_2 [a(k)-1]} = 0$$

In accordance to another aspect of the disclosure, an m-sequence (i.e. maximal-length sequence) may be used to spread at least a portion of a data stream.

A maximal-length sequence or m-sequence is a sequence that can be generated using a linear feedback shift register (LFSR) and have the maximum possible period for an r-stage shift register. As an example, FIG. 15A illustrates an r-stage LFSR (Linear Feedback Shift Register) that may be used to generate an m-sequence of length $N=2^r-1$.

Figure 15A:
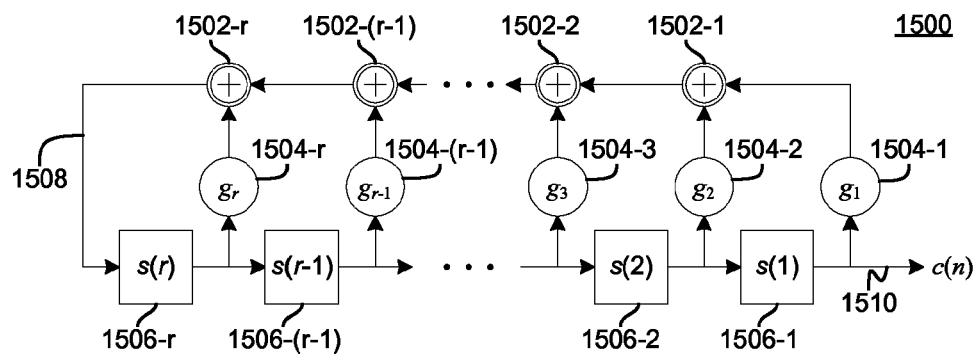
FIG. 15A illustrates an efficient m-sequence (maximal length sequence) generator.

In reference to FIG. 15A, memory elements 1506-1 to 1506-r are initialized to an initial state that is different than all zeros. Each memory element may be implemented as a flip-flop and may hold one bit in memory. The outputs of the memory elements 1506-1 to 1506-r are weighed by the generator polynomial elements 1504-1 to 1504-r. A generator polynomial element of 0 means that there is no connection and 1 means that there is connection. The outputs of the generator elements 1504-1 to 1504-r polynomial elements are fed to XOR gates 1502-1 to 1502-r and the signal 1508 is the feedback signal to feeds back the $r^{th}$ memory element 1506-r. The output 1510 of the LFSR is taken from the first memory element 1506-1.

Figure 15B:
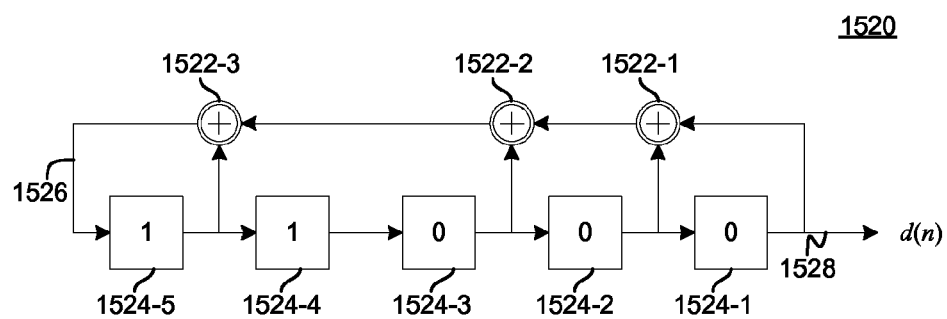
FIG. 15B illustrates an example m-sequence generator for an m-sequence of length 15.

In the following, an example of an m-sequence according to one aspect of the disclosure is provided. First an m-sequence, denoted here d, of length N=31 is generated using a 5-stage LFSR with generator polynomial g=[1, 1, 1, 0, 1] and initial state s=[0, 0, 0, 1, 1] as shown in FIG. 15B, $$d = \begin{bmatrix} 0, 0, 0, 1, 1, 1, 0, 0, 1, 1, 0, 1, 1, 1, 1, 1 \\ 0, 1, 0, 0, 0, 1, 0, 0, 1, 0, 1, 0, 1, 1, 0 \end{bmatrix}$$

By differentially encoding the m-sequence, d, a differentially encoded m-sequence c, which itself is an m-sequence, may be generated $$c = \begin{bmatrix} 1, 1, 1, 0, 1, 0, 0, 0, 1, 0, 0, 1, 0, 1, 0, 1 \\ 1, 0, 0, 0, 0, 1, 1, 1, 0, 0, 1, 1, 0, 1, 1 \end{bmatrix}$$

Figure 15C:
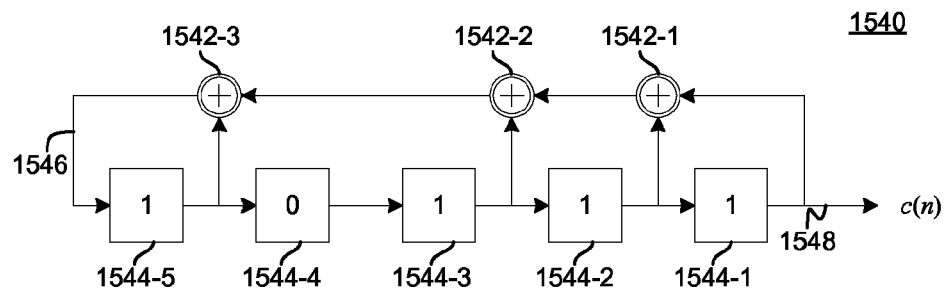
FIG. 15C illustrates an example efficient differential m-sequence generator for an m-sequence of length 15.

In accordance to one aspect of the present invention, the differentially-encoded m-sequence, c, may be generated directly using the efficient m-sequence generator of FIG. 15C comprising 5-stage LFSR with generator polynomial g=[1, 1, 1, 0, 1] and initial state s=[1, 1, 1, 0, 1].

Exemplary Wireless Body Area Network Transmission

Figure 7:
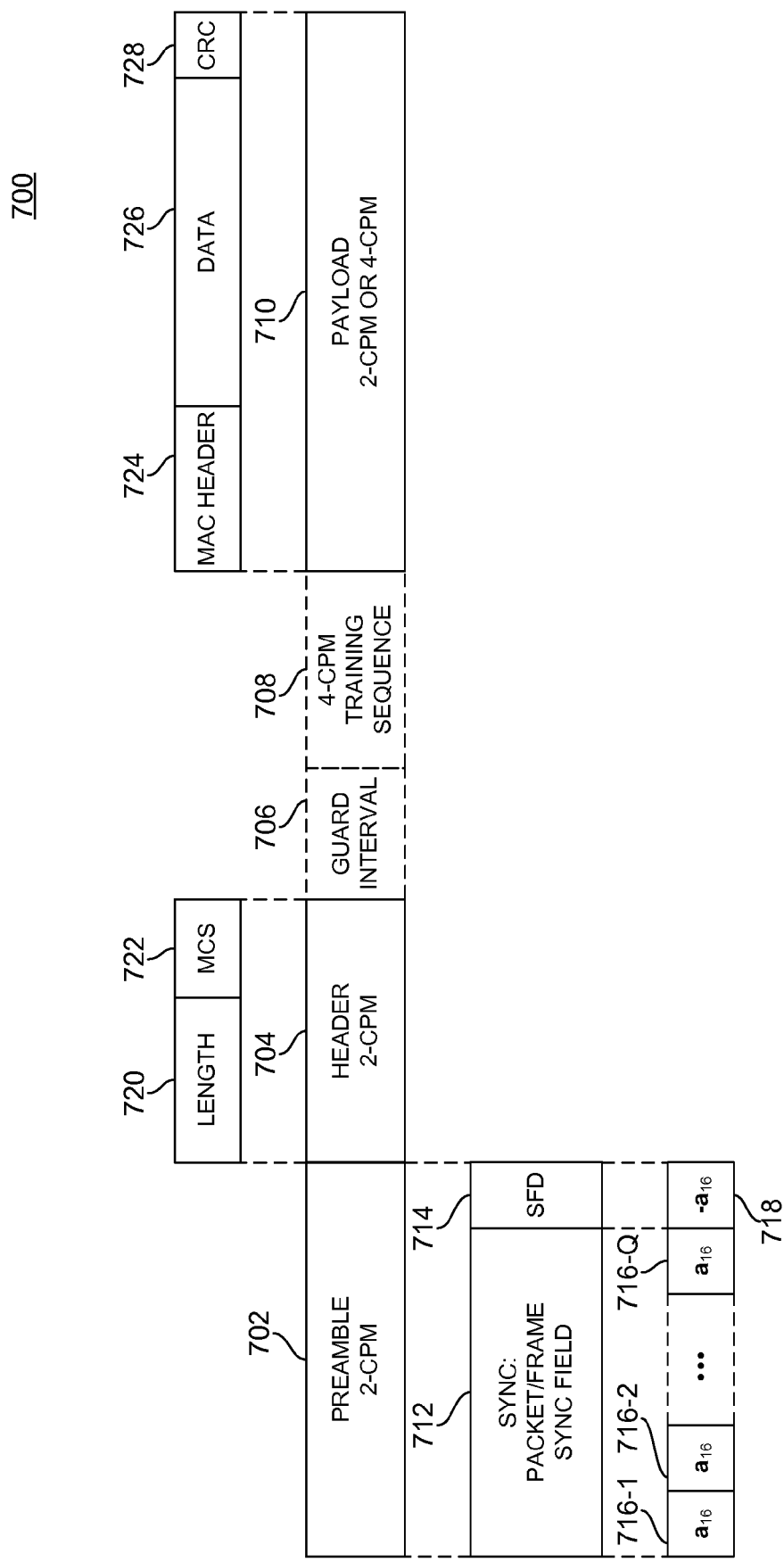
FIG. 7 illustrates a WBAN (Wireless Body Area Network) frame format using Golay and Generalized Golay codes and 2-CPM/4-CPM modulation in accordance to one aspect of the present disclosure.

FIG. 7 illustrates a WBAN frame structure according to one aspect of the invention. The frame structure may be used in wireless communication system 100 in FIG. 1 for beaconing and data transmission from a service access point 104, association and data transmission between a station 106 and the service access point 104, medium access layer (MAC) command frames and responses between station 106 and the service access point 104, and peer to peer control and data frames between two stations, etc.

According to one aspect of the disclosure, a frame (or packet) comprises a preamble 702, header 704, an optional guard interval 706, an optional training sequence 708, and packet payload 710. The preamble may comprise a packet sync sequence field 712, and a start-frame delimiter field 714.

According to one aspect of the disclosure, the preamble and the header are 2-CPM modulated. Equivalently, according to another aspect of the disclosure, the preamble and the header are modulated using filtered $\pi h_2$-DPBPSK, i.e. differential pseudo BPSK modulation followed by continuous chip-level $\pi h_2$-rotation followed by appropriate filtering, such as Bessel filtering or Butterworth filtering, to provide a quasi-constant envelope signal. For the important special case where the modulation index is $h_2=1/2$, this modulation becomes filtered $\pi/2$-DBPSK.

According to another aspect of the invention, the payload may be modulated using either 2-CPM with a preferably modulation index of h=1/2, (or equivalently filtered $\pi/2$-DBPSK) and 4-CPM with modulation index preferably chosen from $h_4=1/4$ or $h_4=1/6$.

The guard interval 706 is absent when the payload is 2-CPM modulated and may be present when the payload is 4-CPM modulated. The guard interval may be used to for example to ensure phase continuity between the header and payload when the modulation is switched between 2-CPM to 4-CPM or to allow the multipath to decay before switching from 2-CPM to 4-CPM.

According to one aspect of the disclosure, the guard interval is absent when the modulation index for 2-CPM, is three times the modulation index for 4-CPM, i.e.

$$h_2 = 3h_4$$

According to one aspect of the disclosure, a 2-CPM signal satisfying the above constraint may be modulated as a 4-CPM signal with $I_k \in \{\pm 3\}$.

According to one aspect of the invention, a 2-CPM signal satisfying the constraint $h_2=3h_4$, may be modulated and demodulated as a 4-CPM signal with d(2k)=d(2k+1).

According to another aspect of the disclosure, the header and payload are spread using one of a Barker sequence of length 3, a Barker sequence of length 5, a Barker sequence of length 7, a Barker sequence of length 11, and a Barker sequence of length 13, prior to CPM modulation.

According to one aspect of the disclosure, the sync filed 710 before 2-CPM modulation is a repetition of zeros spread (XORed) by a Golay codes $a_{16}$ with zero DC level after differential encoding and $\pi/2$-rotation such as the code provided above. This is further illustrated in blocks 716-1, 716-2 to 716-Q. The SYNC filed may be detected coherently or differentially.

According to another aspect of the disclosure, the start-frame delimiter (SFD) field 212 comprises a sequence such as the sequence [1] or [1, 1, 0, 1] spread by $a_{16}$ to indicate the end of the sync field. This is further illustrated in block 718. The SFD may be detected coherently or differentially.

The header 704 may be modulated using 2-CPM or filtered $\pi h_2$-DPBPSK. The header 704 comprises a length field 720 and an MCS field 722. The length field indicates the length of the payload in octets and the MCS (Modulation and Coding Scheme) indicates the modulation and coding scheme used for the payload.

The guard interval 706 may be present when the payload is 4-CPM modulated. It may be used to ramp down after the header and to ramp-up before the payload. It may be used also to guarantee a smooth phase transition between 2-CPM and 4-CPM or to allow the 2-CPM multipath to decay.

According to one aspect of the disclosure, a training sequence 708 such as the sequence provided above is used to allow multipath detection using the circuit shown in FIG. 13A and may be used to re-synchronize the receiver in timing and frequency.

The payload 710 comprises a MAC header 724, a data portion 726, and a CRC (cyclic redundancy check) field 728. The data may be modulated using either 2-CPM or 4-CPM according to one aspect of the disclosure.

In accordance to one aspect of the disclosure, at least one of a Golay sequence, and a generalized-Golay code, with a DC level of magnitude zero after differential encoding and chip-level π/2-rotation is used as a spreading sequence for the preamble portion 702 of the packet. The circuits in FIGS. 14A and 14B may be used to generate the preamble as detailed above.

Exemplary Wireless Body Area Network Reception

At the receiver, multiple tasks are typically performed before detecting the SYNC field of the preamble. Automatic Gain Control (AGC) may be performed first to fit the received signal within the dynamic range of the ADC. For a single bit ADC, an AGC is not required. After AGC, antenna selection is performed and DC offset may be removed. The above tasks may be implemented in different order. After the above tasks are accomplished, packet detection is performed.

According to one aspect of the disclosure, an acquisition circuit performing joint packet detection, time and frequency estimation is shown in FIG. 16A. First the baseband complex received signal 1602 is input to a DC offset removal block 1604.

DC offsets at the receiver may have many origins such as self mixing due to LO (Local Oscillator) leakage. For the case where the preamble is spread using a 2-CPM (or filtered $\pi h_2$-DPBPSK) Golay/generalized-Golay sequence of length N, a DC can be measured by computing the sum or mean over any interval of duration equivalent to K.N chips where K is an integer≧1 since the receiver sees the 2-CPM as a differential Golay/generalized-Golay sequence continuously rotated by $\pi h_2$ in a linear multipath channel (as shown above) and has a zero DC over any K.N chips and therefore, at the receiver an accurate DC offset estimation may be obtained.

For the case where the preamble is spread using a 2-CPM (or filtered $\pi h_2$-DPBPSK) m-sequence of length N, a DC may be measured accurately by computing the sum or mean over a duration equivalent to K.4.N chips where K is an integer≧1. This is where a Golay or Generalized Golay has a huge advantage over m-sequence since the DC is zero over a much shorter length.

The output 1606 of the DC offset removal block 1604 is input to a $\pi h_2$-derotator block 1008. The de-rotator cancels out the $\pi h_2$-rotation applied at the transmitter. It may be implemented as follows $$y(n) = e^{-jn\pi h_2} x(n)$$

where x(n) is the chip level input 1606 and y(n) is the de-rotated output 1610.

The output 1610 of the de-rotator 1608 is input to a chip differential detector 1612. According to one aspect of the invention, the chip differential detector may be implemented as shown in FIG. 16B. The input signal 1642 is delayed by one chip in memory element 1644 and is a complex conjugate is taken in 1648 and the delayed and conjugated output 1650 is multiplied in 1652 with the input signal 1642. The output signal 1654 is the differentially detected signal and corresponds to signal 1614 in FIG. 16A.

The differentially detected signal 1614 is input to an efficient correlator 1616. The efficient correlator may be implemented as a Golay efficient correlator as shown in FIGS. 4A, and 4B, an efficient generalized Golay correlator as shown in FIG. 5A, or as an efficient m-sequence correlator as shown in FIG. 15D.

Figure 15D:
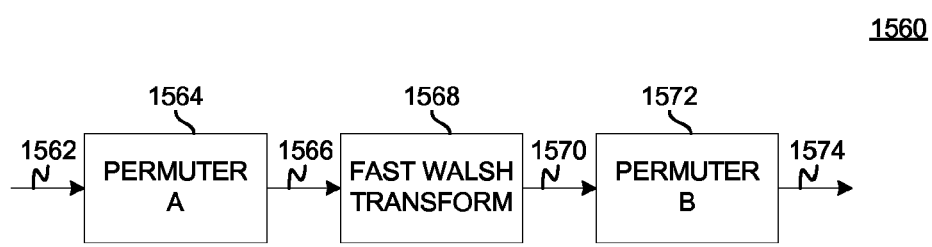
FIG. 15D illustrates an efficient m-sequence correlator according to one aspect of the disclosure.

FIG. 15D illustrates an efficient m-sequence correlator according to one aspect of the disclosure. The input signal 1562 at chip level is first permuted in block 1564. As an example, for the above example of differential m-sequence d, the permuter takes a vector of 31 chips, denoted here y, prepend it with a zero, and outputs a block of 32 permuted chips, denoted here z, according to the following equation $$z = y \begin{bmatrix} 1, 32, 20, 2, 21, 24, 8, 3, 18, 22, 25, 27, 29, 9, 4, 12, \\ 31, 19, 23, 7, 17, 26, 28, 11, 30, 6, 16, 10, 5, 15, 14, 13 \end{bmatrix}$$

i.e., z(1)=y(1), z(2)=y(32), z(3)=y(20), and so on.

The permuted vector z corresponds to signal 1566 and is input to a fast Walsh processor which applies a fast Walsh transform and produces output vector Z corresponding to signal 1570. The signal vector is input to a second permuter 1572 which permutes according to the following equation $$q = z \begin{bmatrix} 1, 17, 9, 5, 3, 2, 30, 20, 21, 11, 6, 32, 19, 10, 26, 18, \\ 22, 24, 23, 12, 25, 13, 7, 4, 29, 15, 8, 31, 16, 27, 14, 28 \end{bmatrix}$$

and discards the first chip to obtain back a 31 bits vector.

The output 1618 of the efficient correlator 1616 in FIG. 16A is input to accumulator 1620. The accumulator accumulates the outputs of the efficient correlator in a memory component comprising M complex memory cells. In a preferred aspect of the present disclosure, the number M is chosen to correspond exactly to the sequence length used in the SYNC field, i.e. for a sampling frequency equals to the chip rate, N=16 in reference to the SYNC filed in FIG. 7 for example. For the example packet structure in FIG. 7, and for a sampling rate equals to the chip rate, the preferred value would be N=16.

According to one aspect of the present disclosure, the accumulator may be implemented using a complex first order IIR (Infinite Impulse Response) filter such as the one shown in FIG. 16 C. The complex input 1662 is first scaled by a factor α in 1666 using multiplier 1664. The output 1668 is added in 1670 to a delayed version 1682 of the scaled output. The signal 1684 is the output of the IIR filter, and is fed back to memory component 1674 that stores M samples; the output 1676 of the memory component 1674 is scaled by a factor β in 1680 using multiplier 1678. The multiplier output 1682 is the feedback signal. The magnitude of the accumulator shift register is an approximation to the multipath power profile over M samples.

The output 1622 of the accumulator 1620 in FIG. 10A is fed to a hypothesis testing device 1624 which compares the magnitude of its input to a given threshold. The magnitude may be computed in different ways such as the sum of the absolute value of the real and the absolute value of the imaginary, or the square root of the of the sum of the square of the real and the square of the imaginary, and so on.

If the magnitude in 1624 is tested above a given threshold, the location of the magnitude that was above the threshold or the location of the maximum magnitude of the accumulator shift register may be used as a coarse timing estimate referred to herein as peak location. The angle of the complex value in the accumulator shift register at the peak location may be used to estimate the frequency error.

According to one aspect of the disclosure, the hypothesis testing in the hypothesis testing device 1624 in FIG. 16B may be performed as follows. First the received signal magnitude, denoted here $R_n$, at time sample n, is computed from the received samples 1622. As an example, an accumulator such as a first order IIR filter may be used for that purpose $$R_n = \mu R_{n-1} + (1-\mu) X_n$$

where $X_n$ is the received signal magnitude and may computed as discussed above, and μ is a forgetting factor of the IIR chosen in such a way $0 \ll \mu < 1$. The received signal magnitude, $R_n$, may be decomposed into two components $$R_n = S_n + I_n$$

where $R_n$ is the ideal received signal power and $I_n$ is the noise plus interference power. The magnitude of the peak in the accumulator shift register 1674 may be approximated as follows $$A_n = \eta S_n + I_n/L$$

where η is the portion of the signal captured in the peak and may be unknown, and L is the equivalent integration length which may be computed form L and the parameters of the IIR filter in FIG. 16C. For large values of L, the following approximation holds $A_n \approx \eta S_n$ and a noise plus interference estimate $I_n$ may be obtained by computing $$\tilde{I}_n = R_n - \rho A_n$$

and the hypothesis testing device performs the following test $$A_n \lessgtr T \cdot \tilde{I}_n$$

where T is a threshold computed to achieve a given probability of detection and false alarm, and a signal is judged to be present if $A_n \geq T \cdot \tilde{I}_n$.

After acquisition, the frequency may be corrected and tracked using the remainder of the preamble, residual DC offset may be removed, multipath channel may be estimated and SFD may be detected.

After SFD detection, the header 704 and payload 708 in FIG. 7 may be demodulated and an estimate of the original data is obtained.

Figure 17:
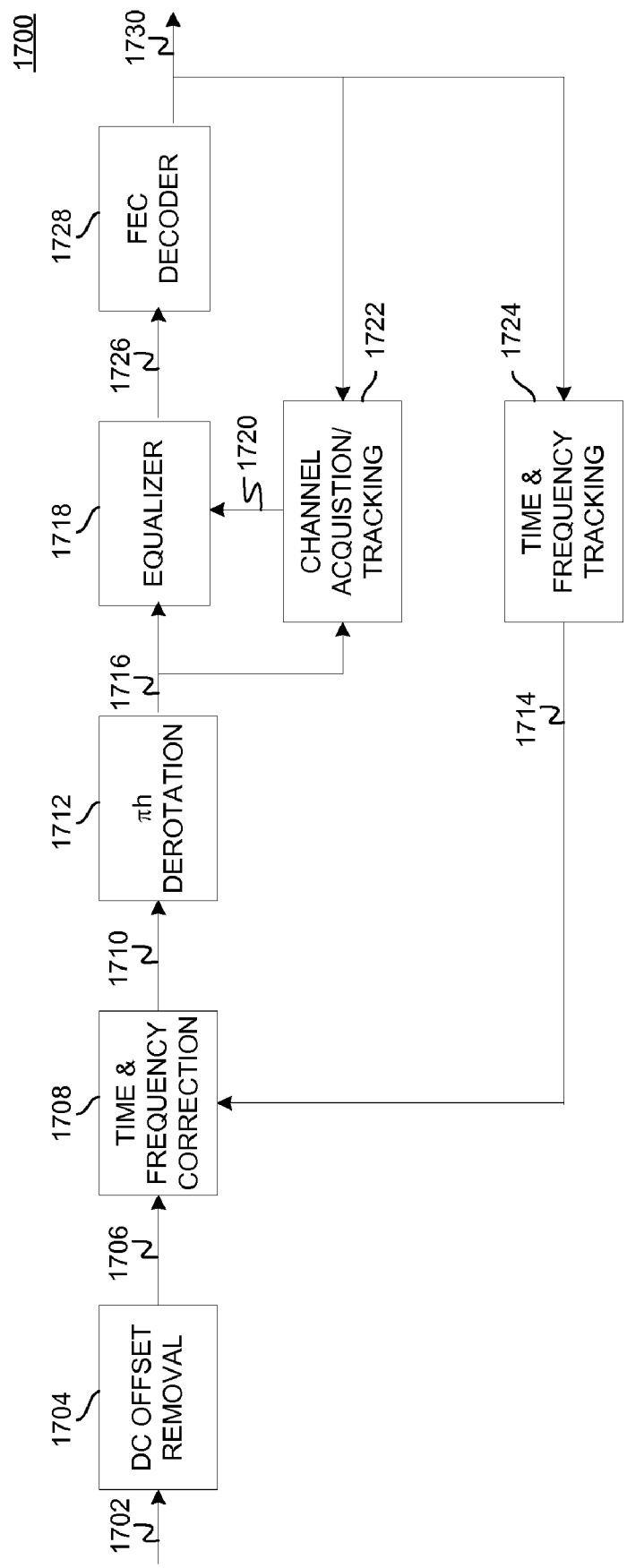
FIG. 17 illustrates an example receiver that may be used to detect a 2-CPM or 4-CPM modulated data stream in accordance to one aspect of the disclosure.

FIG. 17 illustrates an example coherent receiver according to one aspect of the disclosure that may be used to detect the header and payload. The received signal 1702 is first cleaned from any DC in 1704, and the coarse time and frequency estimates from the preamble are used initially in 1708 to correct the frequency and possibly to adjust timing via known interpolation methods. The output signal in 1710 is continuously de-rotated by πh where h=$h_2$ during the header and h=$h_2$ or $h_4$ or $h_2 h_4$ during the payload. The channel estimate is initialized to the CIR estimate from the preamble in 1722 and is fed to 1718 to help equalizing signal 1716. The output of equalizer 1718 may be either soft or hard decisions in 1726 and are input to the FEC decoder 1730. The decoder outputs may be used along with the received signal to adjust time and frequency in 1724 and track the CIR in 1722.

FIG. 18A illustrates example operations 1800 that summarize the preamble encoding applied at a transmission side of the wireless communication system. At 1802, an original transmission data stream comprising a preamble, a header and a payload may be obtained. At 1804 a Golay code or a generalized-code with zero DC (where the DC is computed after differential encoding and $\pi h_2$-rotation) is generated using an efficient Golay or generalized-Golay generator. At 1806, the preamble binary sequence is spread using the generated code. At 1808, the generated preamble is pre-pended to the data stream. At 1810, the preamble and the header are modulated either a 2-CPM modulation or filtered $\pi h_2$-DPBPSK. At 1812, a training sequence is inserted before the payload if the payload is to be 4-CPM modulated. At 1814, the payload or training sequence and payload are modulated using the appropriate modulation scheme, i.e. 2-CPM modulation (or filtered $\pi h_2$-DPBPSK) or 4-CPM (or filtered $\pi h_4$-GDPQPSK). At 1816, the modulated data stream may be transmitted.

Figure 19A:
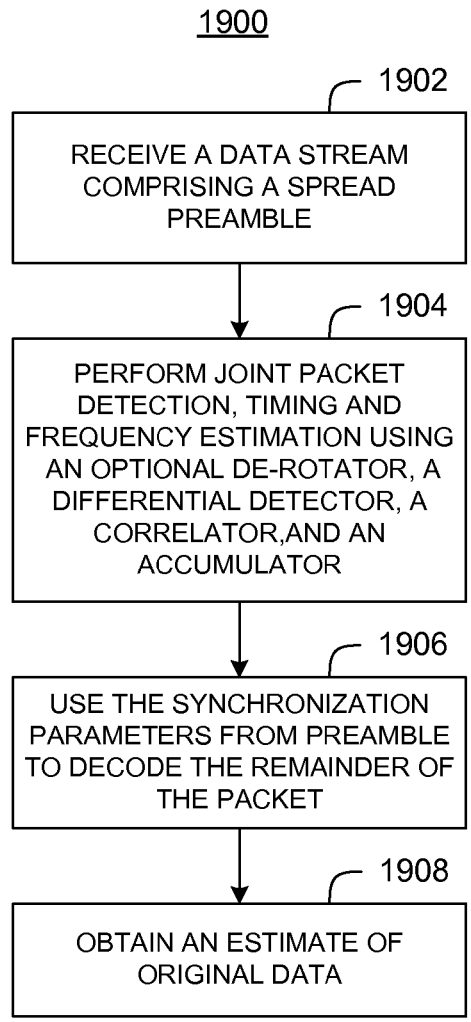
FIG. 19A illustrates an example operations for processing of spread signals at the receiver in accordance with certain aspects of the present disclosure.
Figure 19B:
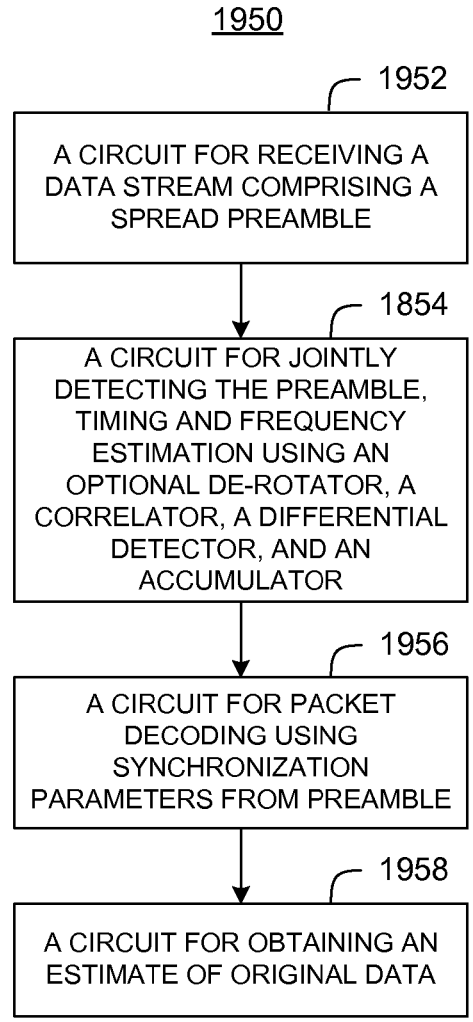
FIG. 19B illustrates example components capable of performing the operations illustrated in FIG. 19A.

FIG. 19A illustrates example operations 1400 that may be performed to process received spread signals. The receiving method provides for processing signals transmitted by a transmit-side signal processor (such as the receiver 304 in FIG. 3) after the signals have propagated through a multipath channel. Receiver front-end processing provides for down-converting and digitizing received signals in order to produce digital baseband signals.

At 1904, the baseband spread data stream comprising a spread preamble is input to a joint detection and synchronization block comprising a $\pi h_2$-derotator, followed by a chip differential detector, followed by a correlator and followed by an accumulator. The synchronization parameters are used in the receiver to aid in decoding the remainder of the packet in 1906 and an estimate of the original data at 1908.

Figure 20A:
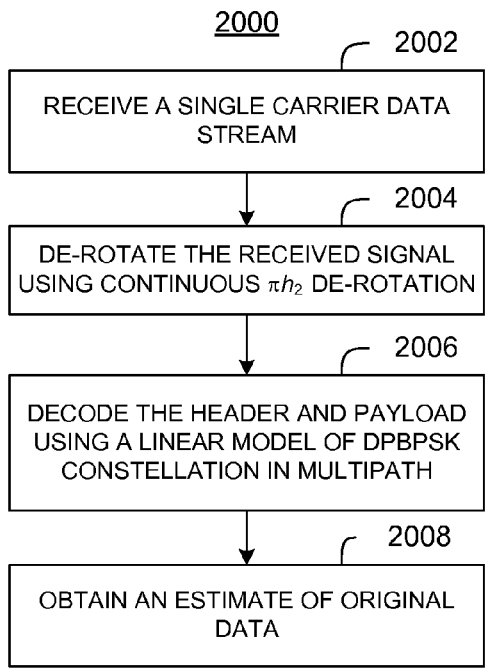
FIG. 20A illustrates example operations for decoding a 2-CPM data stream in accordance with certain aspects of the present disclosure.
Figure 20B:
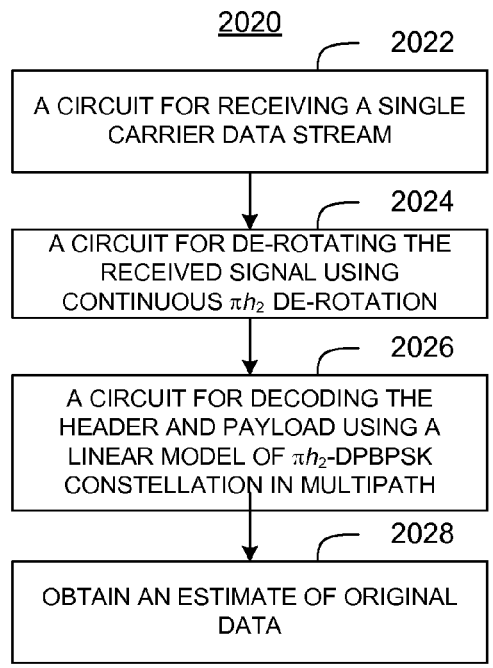
FIG. 20B illustrates example components capable of performing the operations illustrated in FIG. 20A.

FIG. 20A illustrates example operations 1400 that may be performed to process received spread signals. At 2004, the baseband data stream is $\pi h_2$-derotated after possible DC removal, frequency and timing correction. At 2006, the header and payload are decoded by modeling the received signal as a DPBPSK (Differential Pseudo BPSK) chips through a linear multipath channel and an estimate of the original data is obtained at 2008.

Figure 20C:
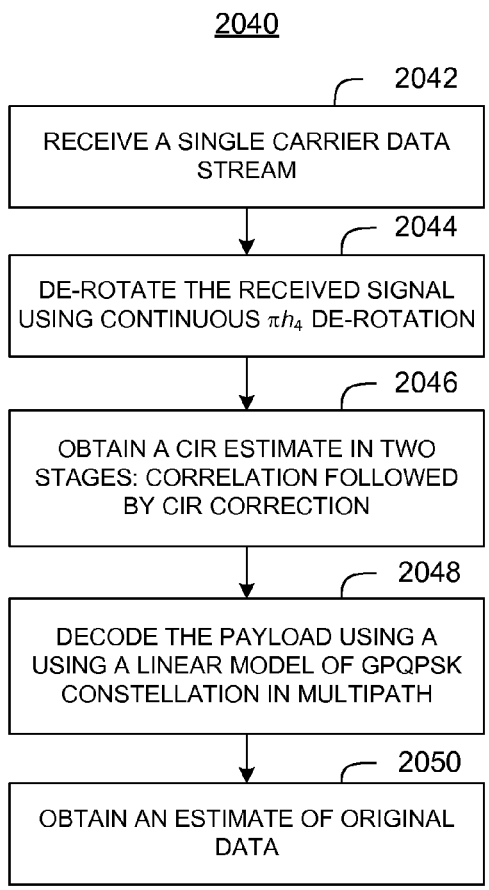
FIG. 20C illustrates an example operations for processing of 4-CPM data stream at the receiver using generalized pseudo QPSK in accordance with certain aspects of the present disclosure.
Figure 20D:
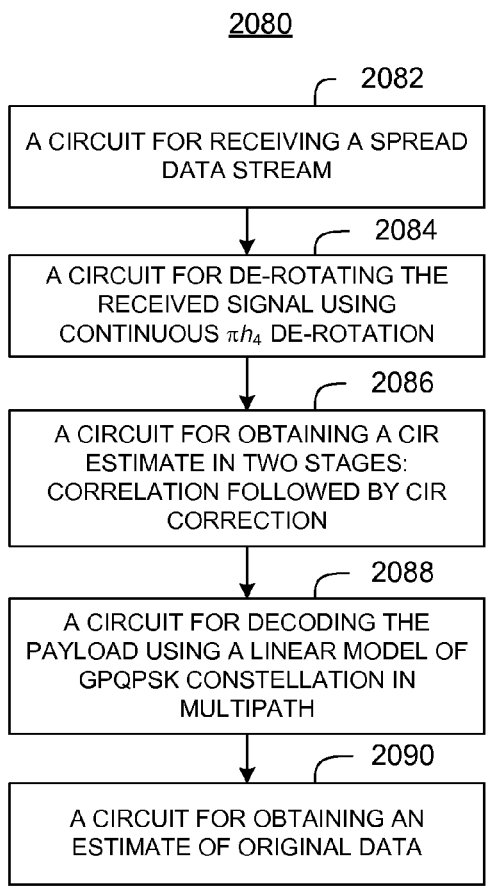
FIG. 20D illustrates example components capable of performing the operations illustrated in FIG. 20C.

FIG. 20C illustrates example operations 1400 that may be performed to process received spread signals that are 4-CPM modulated. At 2042, the baseband data stream is $\pi h_4$-derotated after possible DC removal, frequency and timing correction. At 2046, the CIR (Channel Impulse Response) is estimated using a two steps approach, i.e. correlation with part of the training sequence to obtain a coarse CIR estimate and cleaning the CIR estimate in a second step. At 2048, the payload is decoded by modeling the received signal as a GDPQPSK (Generalized Differential Pseudo QPSK) chips through a linear multipath channel and an estimate of the original data is obtained at 2056.

FIG. 21A illustrates example operations 2100 that may be performed to demodulate received signal that is modulated using non-linear CPM. The transmitted signal may be modulated using one of 2-CPM, 4-CPM, filtered rotated pseudo BPSK, and filtered rotated generalized pseudo QPSK. At 2104, the received signal is continuously de-rotated at symbol level prior to demodulation. The $n^{th}$ symbol is de-rotated by $n\pi h$. For example, for a sampling rate equals to the symbol rate, the $n^{th}$ received sample x (n) becomes x $(n)e^{-jn\pi h}$ after de-rotation. The modulation index $h=h_2$ for 2-CPM and filtered rotated pseudo BPSK modulated signal, and $h=h_4$ for 4-CPM and filtered generalized rotated pseudo QPSK modulated signal.

At 2106, the de-rotated signal is demodulated using a linear superposition of pulses modulated with pseudo PSK symbols as detailed above. For 2-CPM and filtered rotated pseudo BPSK modulated signal, the baseband received signal (ignoring frequency offset, DC offset, noise, and other radio imperfections) is modeled according to the present disclosure as follows $$y(t) = \sum_k c(k)h(t - kT)$$

where h(t) is the filtered multipath channel, i.e. the cascade of the transmitter filters, wireless channel, and receiver filters, T is the symbol duration, and $\{c(k)\}$ is the set of differential pseudo-BPSK symbols. For the special case where $h_2=1/2$, the symbols $\{c(k)\}$ are from a DBPSK constellation and the received signal is demodulated as a linearly modulated DBPSK according to one aspect of the invention. Demodulation methods include differential detection, double differential detection, coherent methods including MLSE (Maximum Likelihood Sequence Estimation), RSSE (Reduced State Sequence Estimation), DFE (Decision Feedback Equalization), MMSE (Minimum Mean Square Error) equalization, and ZFE (Zero Forcing Equalization). For the general case where the symbols $\{c(k)\}$ are form a differential pseudo-BPSK constellation, the signal may be demodulated using any of the above methods with the exception that the de-mapper is a differential pseudo-BPSK de-mapper.

An example differential pseudo-BPSK de-mapper may be implemented by first using a differential detector to transform the differential pseudo BPSK constellation points into pseudo BPSK points. Let us recall that the ideal pseudo BPSK points are $\{1, \exp[-j2\pi h_2]\}$ (corresponding to an input bit of 0 and 1 respectively). Therefore after using a differential detector, a decision device may be used that implements the following rule: if the angle of the received pseudo BPSK symbol is bigger than $-\pi h_2$ than the received bit is estimated to be 0 and if the angle of the received pseudo BPSK symbol is smaller than $-\pi h_2$ than the received bit is estimated to be 1. It should be understood that this hard decision de-mapping rule may be easily modified to provide soft decision de-mapping rule using very well known techniques in the literature.

As another example of differential pseudo-BPSK de-mapper, consider a coherent demodulator such as MLSE. For a sampling rate equals to the symbol rate, the branch metrics may be modified to take into accounts the pseudo-BPSK constellation according to the following equation $$BM = \left| x(n) - \sum_{k=0}^{L} h(k)c(n-k) \right|^2$$

where BM is the branch metric corresponding to the $n^{th}$ received signal sample, $\{h(k)\}$ is the discrete multipath channel of length L+1 symbols, and wherein the symbols $\{c(k)\}$ are from the pseudo BPSK constellation $\{1, \exp[-j2\pi h_2]\}$. The difference with BPSK is that for BPSK constellation, the symbols $\{c(k)\}$ are from the constellation $\{\pm 1\}$.

For 4-CPM and filtered generalized rotated pseudo QPSK modulated signal, the baseband received signal (ignoring frequency offset, DC offset, noise, and other radio imperfections) is modeled according to the present disclosure as follows $$y(t) = \sum_k c(k)h(t - kT - T/2)$$

where h(t) is the filtered multipath channel, i.e. the cascade of the transmitter filters, wireless channel, and receiver filters, T is the symbol duration, and $\{c(k)\}$ is the set of generalized differential pseudo-QPSK symbols. For the special case where $h_4=1/4$, the symbols $\{c(k)\}$ are from a generalized DQPSK constellation and the received signal may be demodulated as a linearly modulated DQPSK according to one aspect of the invention. Demodulation methods include differential detection, double differential detection, coherent methods including MLSE (Maximum Likelihood Sequence Estimation), RSSE (Reduced State Sequence Estimation), DFE (Decision Feedback Equalization), MMSE (Minimum Mean Square Error) equalization, and ZFE (Zero Forcing Equalization). For the general case where the symbols $\{c(k)\}$ are form a generalized differential pseudo-QPSK constellation, the signal may be demodulated using any of the above methods with the exception that the de-mapper is a generalized differential pseudo-QPSK de-mapper.

An example differential pseudo-QPSK de-mapper may be implemented by first using a differential detector to transform the differential pseudo QPSK constellation points into pseudo QPSK points. Let us recall that the ideal pseudo QPSK points are $\{1, \exp[+j2\pi h_4], \exp[-j2\pi h_4], \exp[-j4\pi h_4]\}$ (corresponding to input bits 00, 10, 01, and 11 respectively). Therefore after using a differential detector, a decision device may be used that implements the following rule: if the angle of the received pseudo QPSK symbol is bigger than $\pi h_4$ than the received bits pair are estimated to be 10, otherwise if the angle is bigger than $\pi h_4$ than the received bits pair are estimated to be 00, otherwise if the angle is bigger than $-3\pi h_4$ than the received bits pair are estimated to be 01, otherwise the received bits pair are estimated to be 11.

It should be understood that the above hard decision de-mapping rule may be modified in many ways and that a soft decision de-mapping rule may be easily obtained using very well known techniques in the literature. Furthermore, for an oversampled system, for example for a system with two samples per symbol, even and odd samples may be used jointly to de-map the symbols. For coherent demodulation such as MLSE, the branch metrics may be modified as explained above for the 2-CPM case. However in the case of 4-CPM and filtered generalized differential pseudo-QPSK, it may be advantageous to use two samples per symbol to take advantage of even and odd GDPQPSK symbols where the even symbols are DPQPSK and the odd symbols are derived from even symbols, input bit pairs and modulation index.

It should be understood that if the received signal is not de-rotated as shown in 2104, than the de-mapping should take into account the continuous rotation. After de-mapping in 2108 an estimate of the original data is obtained at 2110.

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in Figures, those operations may have corresponding counterpart means-plus-function components with similar numbering. For example, blocks 1802-1816, 1902-1908, 2002-2008, 2042-2050 and 2102-2110, illustrated in FIGS. 18A, 19A, 20A, 20C, and 21A correspond to circuit blocks 1852-1866, 1952-1958, 2022-2028, 2082-2090, and 2152-2160 illustrated in FIGS. 18B, 19B, 20B 20D, and 21B.

Aspects of the disclosure may be configurable for generating code sets, updating code sets, and/or reassigning user codes in response to demand for network resources, changes in the number of users accessing the network, individual user-access requirements, changes in signal-propagation characteristics (e.g., multipath, Doppler, path loss, etc.), and/or interference (e.g., inter-symbol interference, multiple-access interference, jamming, etc.). Aspects of the disclosure may provide for flexible code lengths, support multiple levels of Quality of Service (QoS), and/or allow for system overloading. Aspects of the disclosure may be optimized for minimum processing complexity, such as to enable suitability for real-time applications, rapid updates, low power consumption, and/or low cost processing components. Particular aspects of the disclosure may be configured to provide for the previously recited features and advantages and/or alternative features and advantages.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The various operations of methods described above may be performed by any suitable means capable of performing the operations, such as various hardware and/or software component(s), circuits, and/or module(s). Generally, any operations illustrated in the Figures may be performed by corresponding functional means capable of performing the operations.

The various illustrative logical blocks, modules and circuits described in connection with the present disclosure may be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of storage medium that is known in the art. Some examples of storage media that may be used include random access memory (RAM), read only memory (ROM), flash memory, EPROM memory, EEPROM memory, registers, a hard disk, a removable disk, a CD-ROM and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware or any combination thereof. If implemented in software, the functions may be stored as one or more instructions on a computer-readable medium. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and Blu-ray® disc where disks usually reproduce data magnetically, while discs reproduce data optically with lasers.

Thus, certain aspects may comprise a computer program product for performing the operations presented herein. For example, such a computer program product may comprise a computer readable medium having instructions stored (and/or encoded) thereon, the instructions being executable by one or more processors to perform the operations described herein. For certain aspects, the computer program product may include packaging material.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

The techniques provided herein may be utilized in a variety of applications. For certain aspects, the techniques presented herein may be incorporated in a base station, a mobile handset, a personal digital assistant (PDA) or other type of wireless device that operate in UWB part of spectrum with processing logic and elements to perform the techniques provided herein.

The invention claimed is:

1. A method for communication, comprising:
receiving a signal modulated with non-linear continuous phase modulation;
demodulating the received signal using a linear superposition of time-shifted pulses modulated with symbols from a continuously rotated differential pseudo Phase Shift Keying (PSK) constellation; and
de-mapping the demodulated signal into data bits from pseudo-PSK symbols or rotated pseudo-PSK symbols.

2. The method of claim 1, wherein continuous phase modulation comprises at 2-CPM, 4-CPM, filtered rotated differential pseudo-BPSK ($\pi h_2$-DPBPSK) modulation, or rotated generalized differential pseudo-QPSK ($\pi h_4$-GDPQPSK) modulation.

3. The method of claim 1, wherein the non-linear continuous phase modulation is filtered $\pi h_2$-DPBPSK modulation that comprises mapping each binary bit of a data stream into one of two constant-amplitude constellation points, differentially encoding the mapped data stream, continuously rotating the differentially encoded and mapped data stream by a constant phase of $\pi h_2$, wherein $\pi$ is Pi and $h_2$ is a modulation index, and filtering the continuously rotated differentially encoded and mapped data stream to produce a quasi-constant envelope signal.

4. The method of claim 3, wherein the $\pi h_2$-DPBPSK modulation-employs symbol-level continuous rotation, wherein each $n^{th}$ symbol is rotated by $n\pi h_2$, where n is an integer-valued index.

5. The method of claim 1, wherein non-linear continuous phase modulation is $\pi h_4$-GDPQPSK modulation that comprises generating even complex symbols and odd complex symbols, wherein generating the even complex symbols comprises mapping bit pairs of a data stream into a constellation of four constant-amplitude points, differentially encoding the mapped data stream, continuously rotating the differentially encoded and mapped data stream by a constant phase of $\pi h_4$, wherein $\pi$ is Pi, and $h_4$ is a modulation index, and wherein the odd symbols are generated by correcting even symbols using a correction term computed from data bit pairs and the modulation index $h_4$.

6. The method of claim 5 wherein the $\pi h_4$-GDPQPSK modulation employs symbol-level continuous rotation, wherein each $n^{th}$ symbol is rotated by $n\pi h_4$, where n is an integer-valued index.

7. The method of claim 1 wherein the received signal comprises a linear superposition of time-shifted pulses modulated with symbols from a rotated differential pseudo-PSK constellation of the form:

$$\sum_n c(n)h(t-nT),$$

where T denotes symbol duration, h(t) is a filtered multipath channel pulse, and {c(n)} is a set of rotated differential pseudo-BPSK mapped symbols obtained from a binary data stream {a(n)} using differential pseudo-BPSK mapping, wherein each bit a(n) of the binary data stream is mapped into one of two constant-amplitude constellation points, differentially encoded, and continuously rotated.

8. The method of claim 7, wherein continuously rotating the differentially encoded and mapped symbols, comprises rotating each $n^{th}$ differentially encoded and mapped symbol by $n\pi h_2$ where n is an integer-valued index, $\pi$ is Pi, and $h_2$ is a modulation index.

9. The method of claim 1, wherein the received signal comprises a linear superposition of time-shifted pulses modulated with symbols from a rotated differential pseudo-PSK constellation of the form:

$$\sum_n c(n)h(t-nT-T/2),$$

where T denotes symbol duration, h(t) is a filtered multipath channel pulse, and {c(n)} is a set of rotated generalized differential pseudo-QPSK mapped symbols obtained from a binary data stream {a(n)} using generalized differential pseudo-QPSK mapping, wherein even symbols {c(2n)} are generated by mapping each pair of bits a(2n) and a(2n+1) of the binary data stream into one of four constant-amplitude constellation points, differentially encoding the mapped symbols, and continuously rotating the differentially encoded and mapped symbols, and wherein odd symbols {c(2n+1)} are generated by correcting the even symbols {c(2n)} by a correction term computed from the pair of bits a(2n) and a(2n+1) and a modulation index $h_4$.

10. The method of claim 9, wherein continuously rotating the differentially encoded and mapped symbols comprises rotating each $n^{th}$ differentially encoded and mapped symbol by $n\pi h_4$, where n is an integer-valued index, $\pi$ is Pi, and $h_4$ is a modulation index.

11. The method of claim 1, wherein the signal is modulated, with 2-CPM modulation with a modulation index $h_2=1/2$, and demodulating the received signal comprises modeling the signal as a linear superposition of pulses modulated with rotated differential BPSK symbols.

12. The method of claim 1, wherein the signal is modulated with 4=CPM modulation with a modulation index $h_4=1/4$, and demodulating the received signal comprises modeling the signal as a linear superposition of pulses modulated with rotated differential QPSK symbols.

13. The method of claim 1, further comprising continuously de-rotating the received signal before demodulating the signal, wherein the $n^{th}$ symbol is de-rotated by $n\pi h$, where n is an integer-valued index, $\pi$ is Pi, and h is a modulation index.

14. The method of claim 1, wherein the de-mapper is configured for performing generalized differential pseudo-QPSK or rotated generalized differential pseudo-QPSK de-mapping.

15. The method of claim 1, wherein the de-mapper is configured for performing differential pseudo-BPSK or rotated differential pseudo-BPSK de-mapping.

16. An apparatus configured to perform the method of claim 1.

17. An apparatus for communication comprising:
a receiver for receiving a signal modulated with non-linear continuous phase modulation;
a demodulating means for demodulating the received signal using a linear superposition of time-shifted pulses modulated with symbols from a continuously rotated differential pseudo Phase Shift Key (PSK) constellation; and a de-mapper for de-mapping the demodulated signal into data bits from pseudo-PSK symbols or rotated pseudo-PSK symbols.

18. An apparatus for communication comprising:

a receiver for receiving a signal modulated with non-linear continuous phase modulation; and a demodulator employing a linear superposition of time-shifted pulses modulated with symbols from a continuously rotated differential pseudo Phase Shift Key (PSK) constellation;

and a de-mapper for de-mapping the demodulated signal into data bits from pseudo-PSK symbols or rotated pseudo-PSK symbols.

19. The apparatus of claim 18, wherein the de-mapper is configured for performing generalized differential pseudo-QPSK or rotated generalized differential pseudo-QPSK de-mapping.

20. The apparatus of claim 18, wherein the de-mapper is configured for performing differential pseudo-BPSK or rotated differential pseudo-BPSK de-mapping.

21. The apparatus of claim 18, wherein the receiver comprises a de-rotator for de-rotating the received signal prior to demodulation, wherein an $n^{th}$ symbol is de-rotated by $n\pi h$, where n is an integer-valued index, $\pi$ is Pi, and h is a modulation index.

* * * * *